United States Patent
Jones et al.

(10) Patent No.: US 9,026,929 B2
(45) Date of Patent: May 5, 2015

(54) EVENT MANAGEMENT/PRODUCTION OF AN ONLINE EVENT USING EVENT ANALYTICS

(71) Applicant: American Teleconferencing Services, Ltd., Atlanta, GA (US)

(72) Inventors: Boland T. Jones, Atlanta, GA (US); David Michael Guthrie, Norcross, GA (US); Nicole C. Santoro, Decatur, GA (US)

(73) Assignee: American Teleconferencing Services, Ltd., Atlanta, GA (US)

( * ) Notice: Subject to any disclaimer, the term of this patent is extended or adjusted under 35 U.S.C. 154(b) by 165 days.

(21) Appl. No.: 13/797,021

(22) Filed: Mar. 12, 2013

(65) Prior Publication Data

US 2013/0198656 A1 Aug. 1, 2013

Related U.S. Application Data

(63) Continuation-in-part of application No. 13/822,379, filed as application No. PCT/US2011/058459 on Oct. 28, 2011, application No. 13/797,021, which is a continuation-in-part of application No. 12/789,993, filed on May 28, 2010, which is a continuation of application No. PCT/US2010/033084, filed on Apr. 30, 2010.

(51) Int. Cl.
*G06F 3/048* (2013.01)
*H04L 29/06* (2006.01)
*H04L 12/58* (2006.01)
(Continued)

(52) U.S. Cl.
CPC .............. *H04L 65/403* (2013.01); *H04L 51/32* (2013.01); *H04L 12/1827* (2013.01); *H04M 3/562* (2013.01); *H04M 3/565* (2013.01); *H04M 3/567* (2013.01); *H04M 7/0027* (2013.01); *H04M 2201/38* (2013.01); *H04M 2201/40* (2013.01); *H04M 2201/42* (2013.01); *H04M 2203/2038* (2013.01); *H04M 2203/655* (2013.01); *G06F 3/0481* (2013.01); *G06F 2203/04803* (2013.01); *H04L 67/36* (2013.01); *H04L 67/306* (2013.01); *H04L 12/1822* (2013.01)

(58) Field of Classification Search
CPC ..... H04L 65/403; H04L 51/32; G06F 3/0481; G06F 2203/04803
USPC ........................................................ 715/765
See application file for complete search history.

(56) References Cited

U.S. PATENT DOCUMENTS

| | | | |
|---|---|---|---|
| 2011/0029893 A1* | 2/2011 | Roberts et al. | 715/753 |
| 2013/0227434 A1* | 8/2013 | Jones et al. | 715/753 |
| 2014/0047025 A1* | 2/2014 | Jones et al. | 709/204 |

*Primary Examiner* — David Phantana Angkool
(74) *Attorney, Agent, or Firm* — Smith Risley Tempel Santos LLC

(57) ABSTRACT

Various embodiments of systems, methods, and computer programs are disclosed for producing an online event. One embodiment is a method comprising: a conferencing system establishing an audio conference between one or more speakers and a plurality of listen-only viewers accessing the conferencing system via a communication network; the conferencing system presenting an event production user interface to an event producer, the event production user interface configured to enable the event producer to selectively control a viewer user interface presented to the listen-only viewers during the online event; obtaining analytics data associated with the online event; and during the online event, providing a production recommendation to the event producer in the event production user interface based on the analytics data.

46 Claims, 40 Drawing Sheets

(51) Int. Cl.
*H04L 12/18* (2006.01)
*G06F 3/0481* (2013.01)
*H04L 29/08* (2006.01)
*H04M 3/56* (2006.01)
*H04M 7/00* (2006.01)

| PARTICIPANT ID 302 | ROLE 304 | AUDIO STREAM ID 306 |
|---|---|---|
| 302a | PRODUCER | 306a |
| 302b | SPEAKER | 306b |
| 302c | SPEAKER | 306c |
| 302d | VIEWER | 306d |
| 302e | VIEWER | 306e |
| 302f | VIEWER | 306f |

EVENT MANAGEMENT/PRODUCTION OF AN ONLINE EVENT USING EVENT ANALYTICS

CROSS-REFERENCE TO RELATED APPLICATIONS

This application is a continuation-in-part patent application of and claims the benefit of the priority of the following co-pending applications: U.S. patent application Ser. No. 13/822,379, entitled "Event Management/Production for an Online Event" and filed on Mar. 12, 2013, which is a U.S. National Stage Application under 35 U.S.C. 371 of International Patent Application Serial No. PCT/US11/58459, entitled "Event Management/Production for an Online Event" and filed Oct. 28, 2011; and U.S. patent application Ser. No. 12/789,993, entitled "Systems, Methods, and Computer Programs for Providing a Conference User Interface" and filed May 28, 2010, which is a continuation filed under 35 U.S.C. 111(a) of International Patent Application Serial No. PCT/US2010/33084, entitled "Systems, Methods, and Computer Programs for Providing a Conference User Interface" and filed Apr. 30, 2010. Each of the above-referenced applications is hereby incorporated by reference in its entirety.

BACKGROUND

Currently, there are a number of conference solutions for enabling people to conduct live meetings, conferences, presentations, or other types of gatherings via the Internet, the public switched telephone network (PSTN), or other voice and/or data networks. Participants typically use a telephone, computer, or other communication device that connects to a conference system. The meetings include an audio component and a visual component, such as, a shared presentation, video, whiteboard, or other multimedia, text, graphics, etc. These types of convenient conference solutions have become an indispensable form of communication for many businesses and individuals.

Despite the many advantages and commercial success of existing conference, meeting, grouping or other types of gathering systems, there remains a need in the art for improved conference, meeting, grouping or other types of gathering systems, methods, and computer programs.

SUMMARY

Various embodiments of systems, methods, and computer programs are disclosed for producing an online event. One embodiment is a method comprising: a conferencing system establishing an audio conference between one or more speakers and a plurality of listen-only viewers accessing the conferencing system via a communication network; the conferencing system presenting an event production user interface to an event producer, the event production user interface configured to enable the event producer to selectively control a viewer user interface presented to the listen-only viewers during the online event; obtaining analytics data associated with the online event; and during the online event, providing a production recommendation to the event producer in the event production user interface based on the analytics data.

Another embodiment is a computer program embodied in a computer readable medium and executable by a processor for producing an online event. The computer program comprises logic configured to: establish an audio conference between one or more speakers and a plurality of listen-only viewers accessing the conferencing system via a communication network; present an event production user interface to an event producer, the event production user interface configured to enable the event producer to selectively control a viewer user interface presented to the listen-only viewers during the online event; obtain analytics data associated with the online event; and during the online event, provide a production recommendation to the event producer in the event production user interface based on the analytics data.

A further embodiment is a computer system comprising a conferencing system, an event management/production system, and an analytics engine. The conferencing system establishes an audio conference between a plurality of listen-only viewers, an event producer, and one or more speakers, each operating a corresponding computing device connected via a communication network. The event management/production system is in communication with the conferencing system. The event management/production system is configured to present an event production user interface to the event producer. The event production user interface is configured to enable the event producer to selectively control a viewer user interface presented to the listen-only viewers during the online event. The analytics engine receives analytics data associated with the online event and, during the online event, provides a production recommendation to the event producer in the event production user interface based on the analytics data.

BRIEF DESCRIPTION OF THE DRAWINGS

FIG. 32 illustrates a screen shot of an embodiment of a user interface for viewing analytics related to a Q&A session from an online event.

FIG. 39 illustrates a screen shot of an embodiment of user interface for displaying pre-event analytics.

DETAILED DESCRIPTION

Various embodiments of systems, methods, and computer programs are disclosed for managing and/or producing an online conference or event. The online event may be used for conferences, meetings, groupings, or other types gatherings (collectively, an online "conference" or "event"). The online conference may be organized, hosted, promoted, produced, or presented by any business, group, individual, or other content provider for any desirable purpose or target audience (e.g., promotional events, online seminars, entertainment broadcasts, product launches, corporate events, etc.).

As described below in more detail with reference to FIGS. 1-23, the online event is provided by a system that establishes an audio conference between one or more speakers and a target audience. The target audience (referred to as "viewers") may experience the audio conference in a listen-only mode ("listen-only viewers"). The system providing the audio conference (a "conferencing" or "conference" system) also presents various role-specific conference user interfaces to the participants during the online event. A viewer user interface comprises the main user interface for presenting the audio conference and the online event to the viewers. A speaker user interface may be presented to the speakers, which may mirror the viewer user interface in terms of content but with optional functionality or alternative content not presented to the viewers. An event production user interface comprises a specially-configured user interface for enabling an event producer to selectively control various aspects of the viewer user interface and/or the speaker user interface. It should be appreciated that the control mechanisms generally comprise tools for enabling the event producer to customize or configure—during the online event—the manner in which the viewers and the speakers experience the online event. In exemplary embodiments, the event production user interface may be configured to enable the event producer to, for example, specify an active speaker to be displayed in the viewer user interface, select one or more presentation schemes or views for the viewer user interface, select and introduce media (e.g., audio, video, documents, presentations, graphics, etc.) for presentation in the viewer user interface, moderate public and/or private chats between the viewers and/or the speakers, or view questions submitted by the viewers and select which ones to present in the viewer user interface.

The conferencing system and the conference user interfaces may be generally configured in the manner described in the above-referenced parent application. The conference user interfaces may be configured to provide any desirable content and/or functionality and may support various user interface and/or conferencing features.

Figure 1:
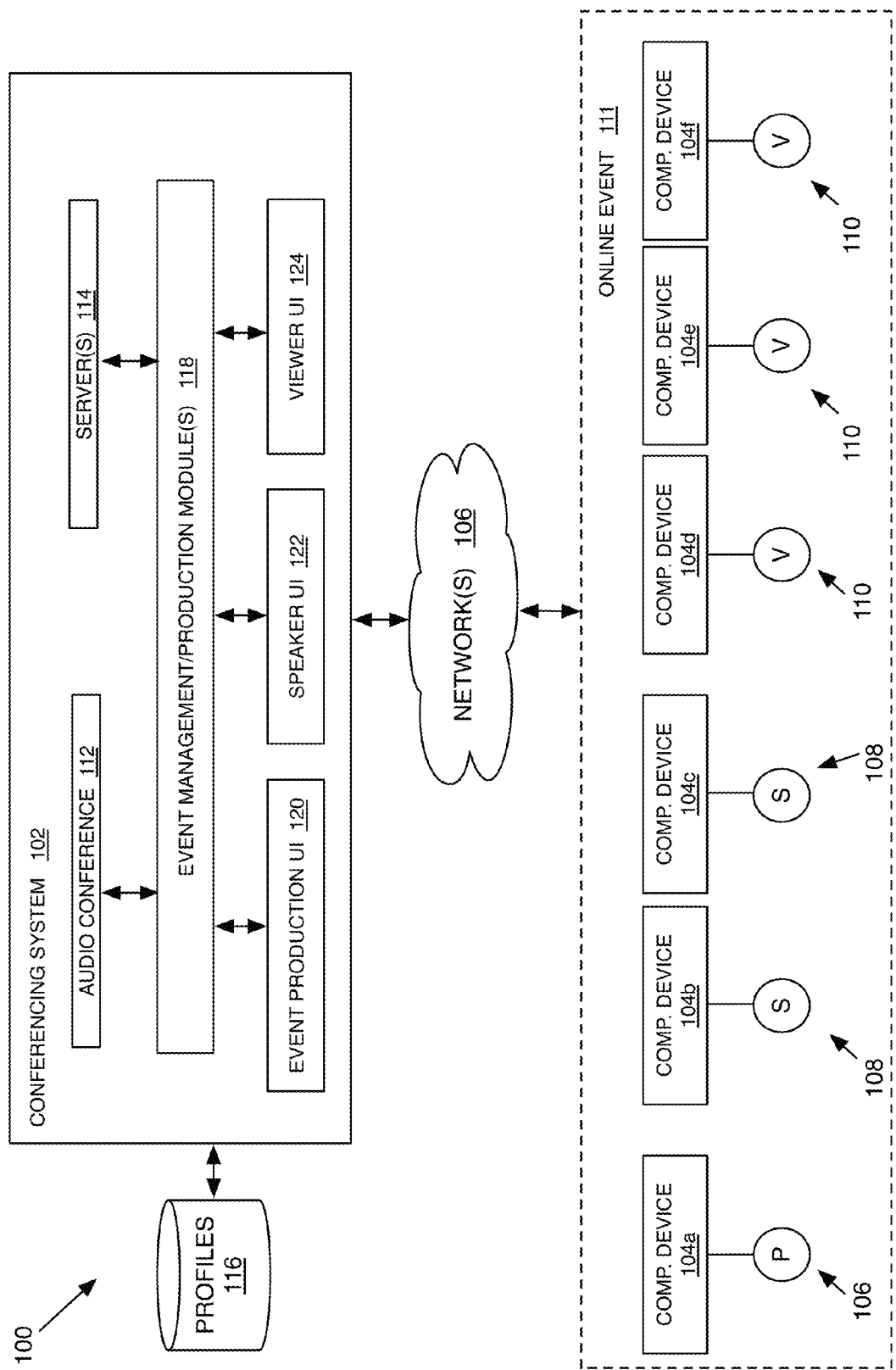
FIG. 1 is a block diagram illustrating an embodiment of a computer system for managing and/or producing an online event comprising one or more speakers and a plurality of viewers.

FIG. 1 illustrates an embodiment of a computer system 100 for providing an online event 111 that may be managed and/or produced by an event producer. The computer system 100 comprises a conferencing system 102 and a plurality of computing devices 104 connected via one or more communication networks 106. The network(s) 106 may support wired and/or wireless communication via any suitable protocols, including, for example, the Internet, the Public Switched Telephone Network (PSTN), cellular or mobile network(s), local area network(s), wide area network(s), or any other suitable communication infrastructure. The computing devices 104 may be associated with corresponding participants (an event producer 106, one or more presenters or speakers 108, and viewers 110) in an online event 111 (including an audio conference 112).

The computing devices 104 may comprise any desirable computing device, which is configured to communicate with the conferencing system 102 and an associated server(s) 114 via the networks 106. The computer device 104 may comprise, for example, a personal computer, a desktop computer, a laptop computer, a mobile computing device, a portable computing device, a smart phone, a cellular telephone, a landline telephone, a soft phone, a web-enabled electronic book reader, a tablet computer, or any other computing device capable of communicating with the conferencing system 102 and/or the server(s) 114 via one or more networks 106. The computing device 104 may include client software (e.g., a browser, plug-in, or other functionality) configured to facilitate communication with the conferencing system 102 and the server 114. It should be appreciated that the hardware, software, and any other performance specifications of the computing device 104 are not critical and may be configured according to the particular context in which the device is to be used.

Figure 3:
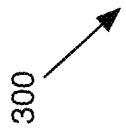
FIG. 3 is a data diagram illustrating an embodiment of a data structure for defining, managing, and controlling the participant roles in the online event.

In the embodiment of FIG. 1, the conferencing system 102 generally comprises a communication system for establishing an online event 111 and/or the audio conference 112 between the computing devices 104. The conferencing system 102 may support audio via a voice network and/or a data network. In one of a number of possible embodiments, the conferencing system 102 may be configured to support, among other platforms, a Voice Over Internet Protocol (VoIP) conferencing platform such as described in U.S. patent application Ser. No. 11/637,291 entitled "VoIP Conferencing," filed on Dec. 12, 2006, which is hereby incorporated by reference in its entirety. It should be appreciated that the conferencing system 102 may support various alternative platforms, technologies, protocols, standards, features, etc. Regardless of the communication infrastructure, the conferencing system 102 may be configured to establish an audio connection with the computing devices 104, although in some embodiments the audio portion may be removed. As illustrated in FIG. 3, the conferencing system 102 and/or servers 114 may establish the audio conference 112 by combining audio streams 306a-306f associated with computing devices 104a-104f. Each computing device 104 may be logically associated with a unique participant ID 302 stored in a profiles database 116. The role of the participants may be defined with a role status 304 indicating whether the participant is a speaker 108, a viewer 110, or the event producer 106.

Figure 2:
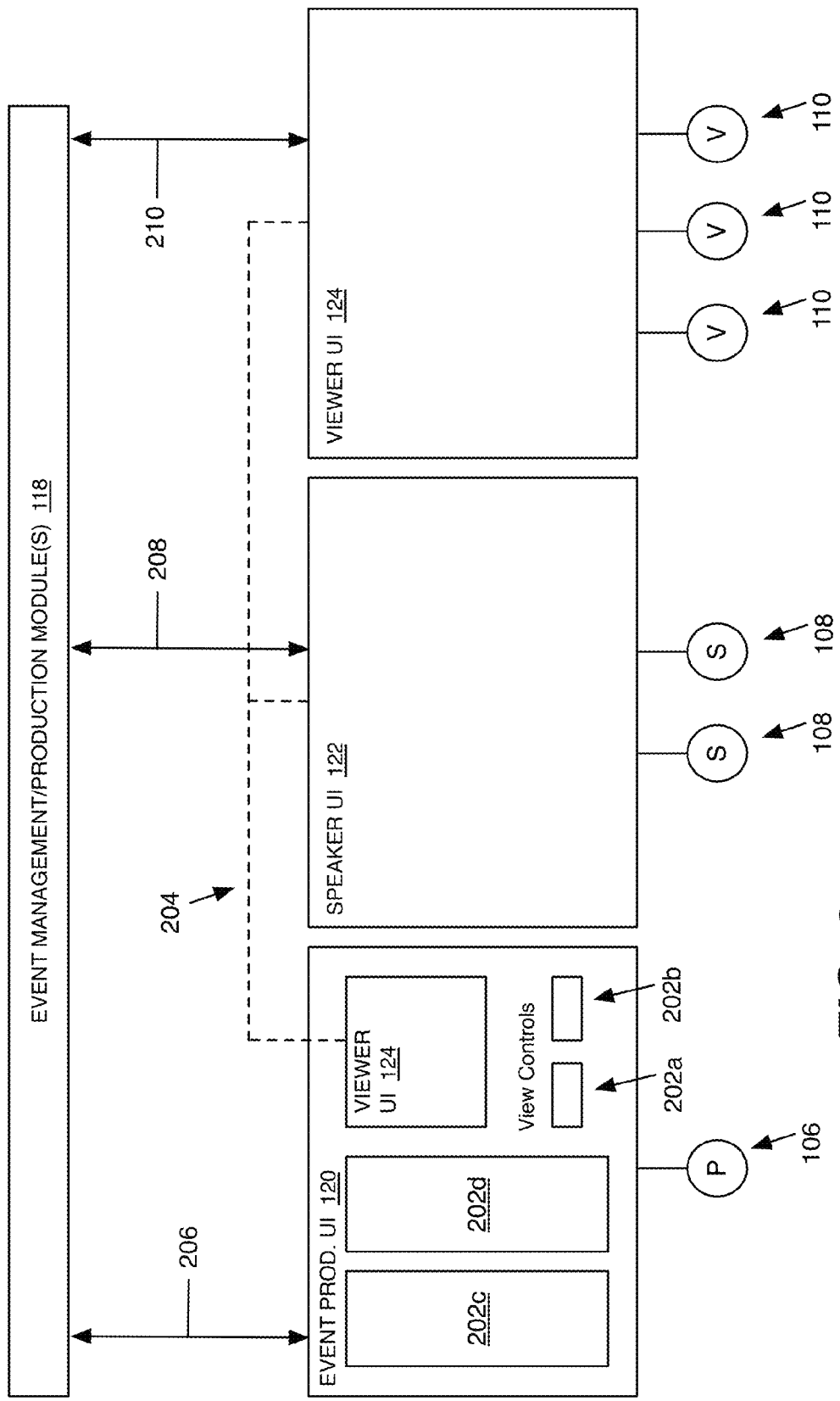
FIG. 2 is a combined functional/block diagram illustrating the general architecture, operation, and/or functionality of an embodiment of the event management/production module(s) of FIG. 1.

Referring again to FIG. 1, conferencing system 102 may comprise event management/production module(s) 118 configured to present an event production user interface 120, a speaker user interface 122, and a viewer user interface 124. As illustrated in FIG. 2, during the online event, the event production user interface 120 is presented to the event producer 106, the speaker user interface 122 is presented to the speakers 108, and the viewer user interface is presented to the viewers 110. Each of the user interfaces 120, 122, and 124 may be presented via a client application (e.g., a browser, one or more browser plug-ins, and/or a special-purpose client). It should be appreciated that the user interfaces 120, 122, and 124 may include logic located and/or executed at the computing devices 104, the conferencing system 102, server(s) 114, or any combination thereof, and may be presented to and displayed via a graphical user interface and an associated display (e.g., touchscreen display device or other display device).

The event management/production modules 118 (and any other associated control and presentation modules) may be embodied in memory and executed by one or more processors. It should be appreciated that any aspects of the event management/production modules 118 may be stored and/or executed by the computing devices 104, the conferencing system 102, the servers 114, or other related server(s) or web services.

Referring to FIG. 2, the event management/production module(s) 118 enable the conferencing system 102 to separately configure, manage, and control the user interfaces 120, 122, and 124, as well as provide the audio conference 112 and any other content and/or functionality to the computing devices 104. Communications with the event producer 106 may be controlled via a communication channel 206 that presents the event production user interface 120. Communications with the speakers 108 may be controlled via a communication channel 208 that presents the speaker user interface 122. Communications with the viewers 110 may be controlled via a communication channel 210.

As mentioned above, the event production user interface 120 generally comprises various tools for enabling the event producer 106 to selectively control various aspects of the viewer user interface 124 and/or the speaker user interface 122 during the online event 111. The event production user interface 120 may comprise one or more user interface components (202) for implementing various control features. In the exemplary embodiment of FIG. 2, the viewer user interface 124 and/or the speaker user interface 122 may be simultaneously displayed in the event producer user interface 120 (reference line 204) to enable the event producer 106 to see what is being displayed to the speakers 108 and/or the viewers 110 during the online event 111. It should be appreciated that the control mechanisms 202 generally comprise production tools for enabling the event producer 106 to customize the content and/or functionality presented in the speaker user interface 122 and/or the viewer user interface 124.

Figure 4:
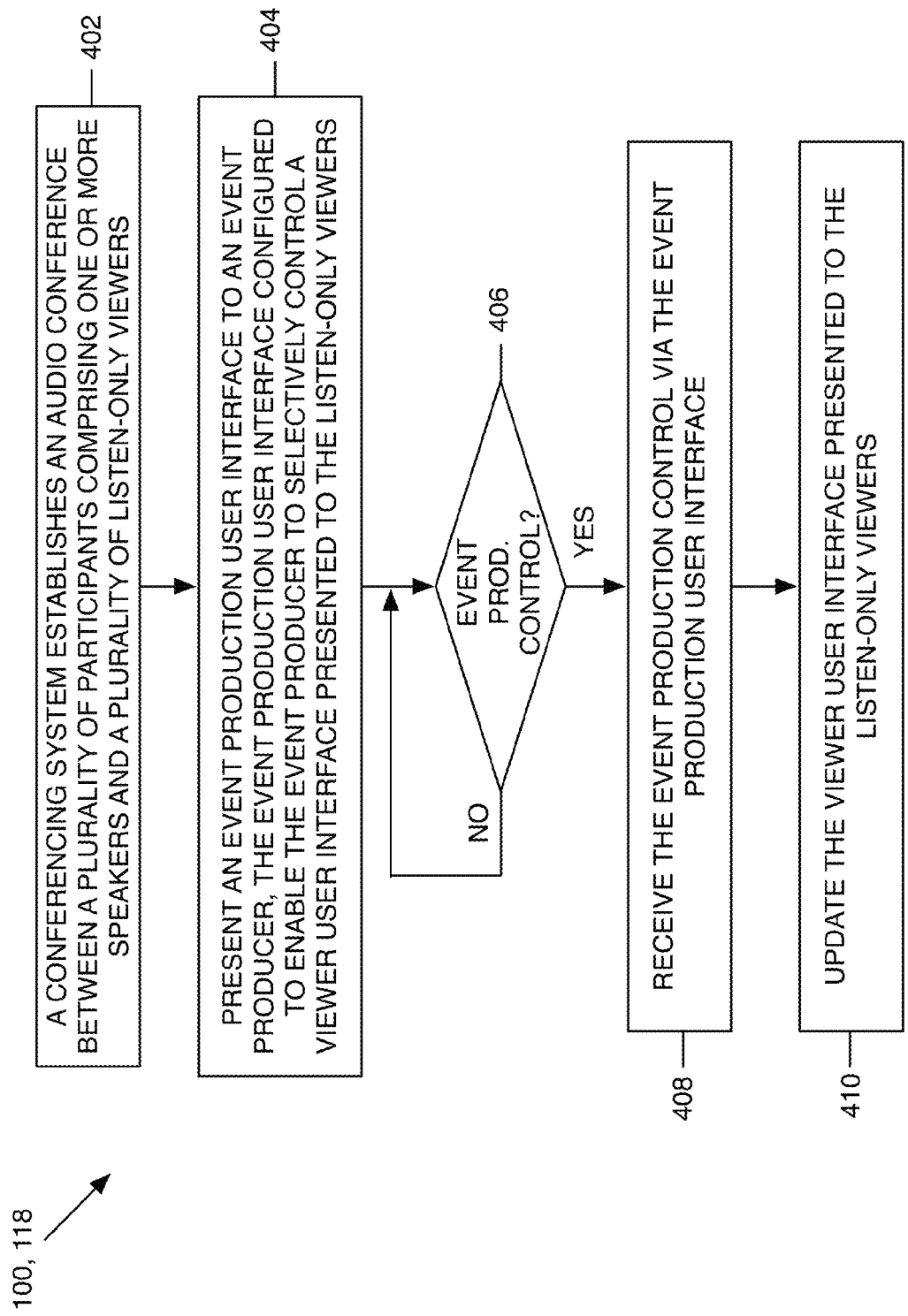
FIG. 4 is a flowchart illustrating the architecture, operation, and/or functionality of an embodiment of the event management/production module(s) of FIG. 1.

FIG. 4 is a flowchart illustrating the general architecture, operation, and/or functionality of an embodiment of the event management/production modules 118. At block 402, the conferencing system 102 establishes an audio conference 112 between one or more speakers 108, the event producer 106, and a plurality of viewers 110 accessing the conferencing system 102 via computing devices 104 connected to network(s) 106. Although not required, the viewers 110 may be added to the audio conference 112 in a listen-only mode so that they are only able to listen to the audio, while the speakers 108 are able to listen and speak. Depending on the particular purpose and context for the event, the online event 111 may host any number of event producers 106, speakers 108, and viewers 110. It should be appreciated, however, that the event production and management tools may be particularly advantageous for controlled situations in which the event is organized by a content provider and directed to a large audience of viewers 110 (e.g., hundreds or even thousands or more viewers).

At block 404, the conferencing system 102 and/or servers 114 present the event production user interface 120 to the event producer 106. As described below in more detail, the event production user interface 120 may comprise various components 202 for enabling the event producer 106 to selectively control the content and/or functionality presented in the viewer user interface 124 and speaker user interface 122. If the event producer 106 desires to produce content or configure certain functionality or applications, the applicable event production/management controls (components 202) are selected via the event production user interface 120 (decision block 406). At block 408, the event management/production modules 118 receive an event production control command initiated by the event production user interface 120. In response to the command, the event production/management modules 118 determine the particular control being requested and then update the viewer user interface 124 and/or the speaker user interface 122 with the associated content and/or functionality.

Figure 5:
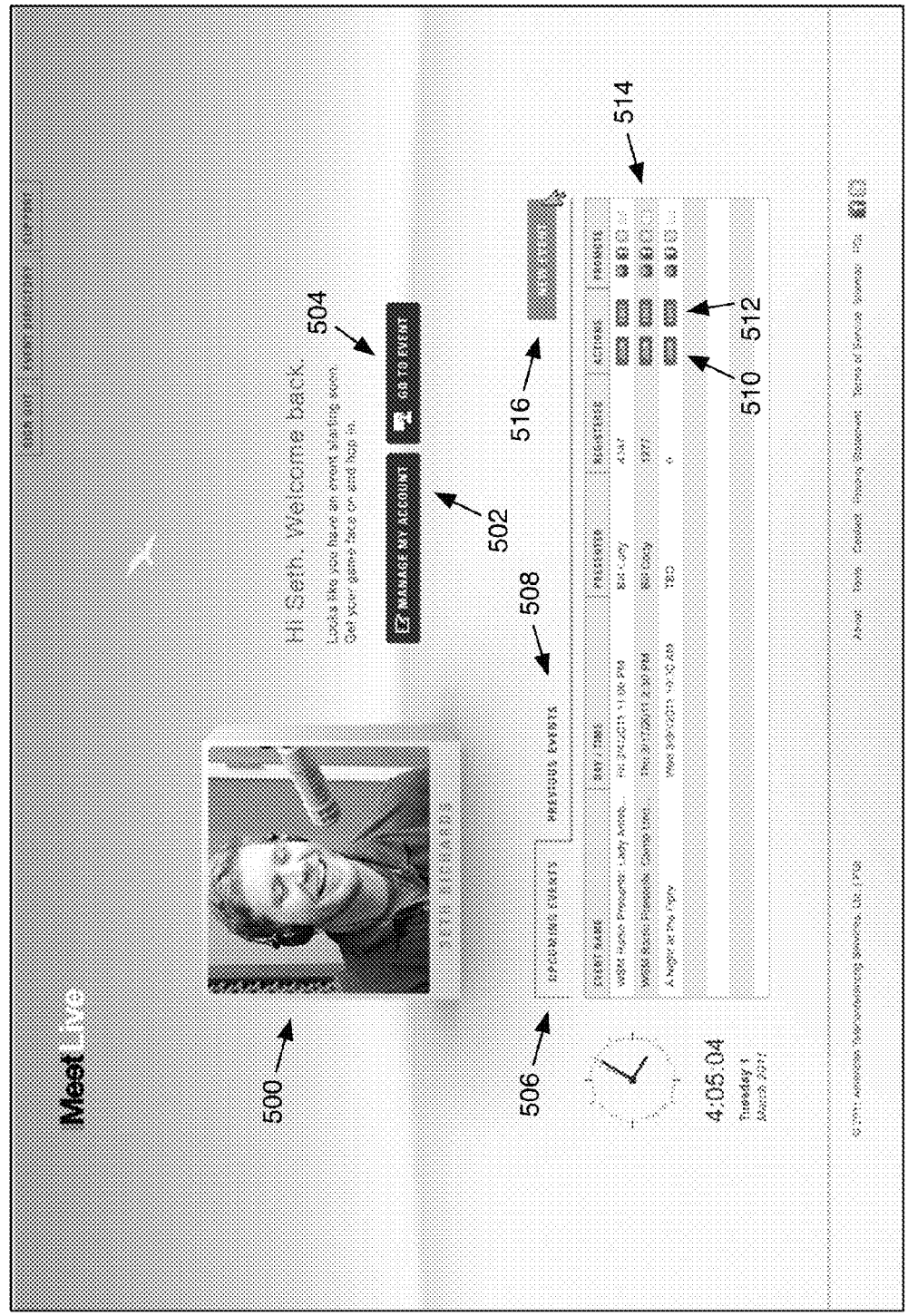
FIG. 5 is a user interface screen shot illustrating an embodiment of the event production user interface of FIGS. 1 & 2 for displaying an events dashboard.

It should be appreciated that the event production/management controls may be initiated, scheduled, or performed at any applicable time before the online event 111 or during the online event 111. FIG. 5 illustrates an embodiment of the event production user interface 120 for managing upcoming events (tab 506) or previous events (tab 508), scheduling new events (component 516), starting an event (component 504), or managing an event production account (component 502). The event production account may be associated with a content provider or a third party that manages online events 110 for the content provider. FIG. 5 illustrates a list of upcoming scheduled events by event name, day/time and presenter, and may indicate the number of current viewers registered for the online event 111. The event producer 106 may join an online event 111 already scheduled by selecting an item from the list view (join button 510). Existing online events 110 may also be edited via edit button 512 or promoted via associated social networking or other web-based communication or marketing tools (buttons 514).

As described in the above-referenced parent patent application, the various user interfaces may be configured to visually identify one or more participants with unique participant objects 500 for identifying the participants. In FIG. 5, a participant object 500 is displayed identifying the event producer 106. In an embodiment, a participant object 500 (displayed in any of the user interfaces 120, 122, and 124) may comprise a graphical representation, profile information, an audio indicator, and a business card component. The graphical representation may comprise a picture, photograph, icon, avatar, etc. for identifying the corresponding participant. The graphical representation may comprise an image that is uploaded to the server 114, imported from a social networking profile, or selected and/or customized from predefined images. The graphical representation may also comprise a default image if one has not been defined by a participant.

The profile information may comprise information provided by the participant and stored in user profiles database 116 (FIG. 1). The audio indicator visually identifies when the associated participant is speaking during the audio conference 112 by monitoring the audio streams 306. The audio stream 306 may be logically associated with the corresponding audio indicator according to a participant identifier 302. During the audio conference 112 when a participant is speaking, the audio indicator may be displayed in a first visual state, such as, by graying out the audio indicator. When the participant is speaking, the audio indicator may be displayed in a second visual state, such as, by blacking out the audio indicator. It should be appreciated that any visual and/or audio distinctions may be employed to identify a speaking participant in any of the user interfaces 120, 122, and 124.

The participant objects 500 may include a user interface component for launching a business card component that, when selected, displays further information about the participant. The business card component may trigger the display of any additional participant profile or identification information. When the component is selected, the participant object 500 "flips" to the business card component, which displays additional parameters (e.g., name, title, organization, location, contact information, interests, or other biographical information). The business card component may further comprise a participant profile control, which comprises a user interface control for enabling the participants to edit their own, or another participant's, information during the online event 111. An "exit" button may be selected to "flip" the object to a default display.

In another embodiment, the interactive participant object 500 may be customized by a participant. The participant object 500 may be configured as an interactive shape (e.g., a cube) with a plurality of user-selectable display portions (e.g., two or more cube faces. The cube faces may be customized to display various types of information, including, a personal greeting, a menu listing available social networking accounts associated with the participant. As described in the above-referenced patent application, the conferencing system 102 may be configured to communicate with social networking systems via an API. During the online event 111, other participants may interact with displayed participant objects 500 and, for example, view the participant's social networking profile displayed in one of the cube faces. One or more links may also be displayed for viewing the participant's full profile, as well as sending a request to join the participant's social network. In another embodiment, a participant may also customize various aspects of the participant objects 500 during the online event 111. The participants may also resize a particular participant object 500, rearrange displayed participant objects 500, or customize their own participant object 500 directly from the participant object 500.

Figure 6:
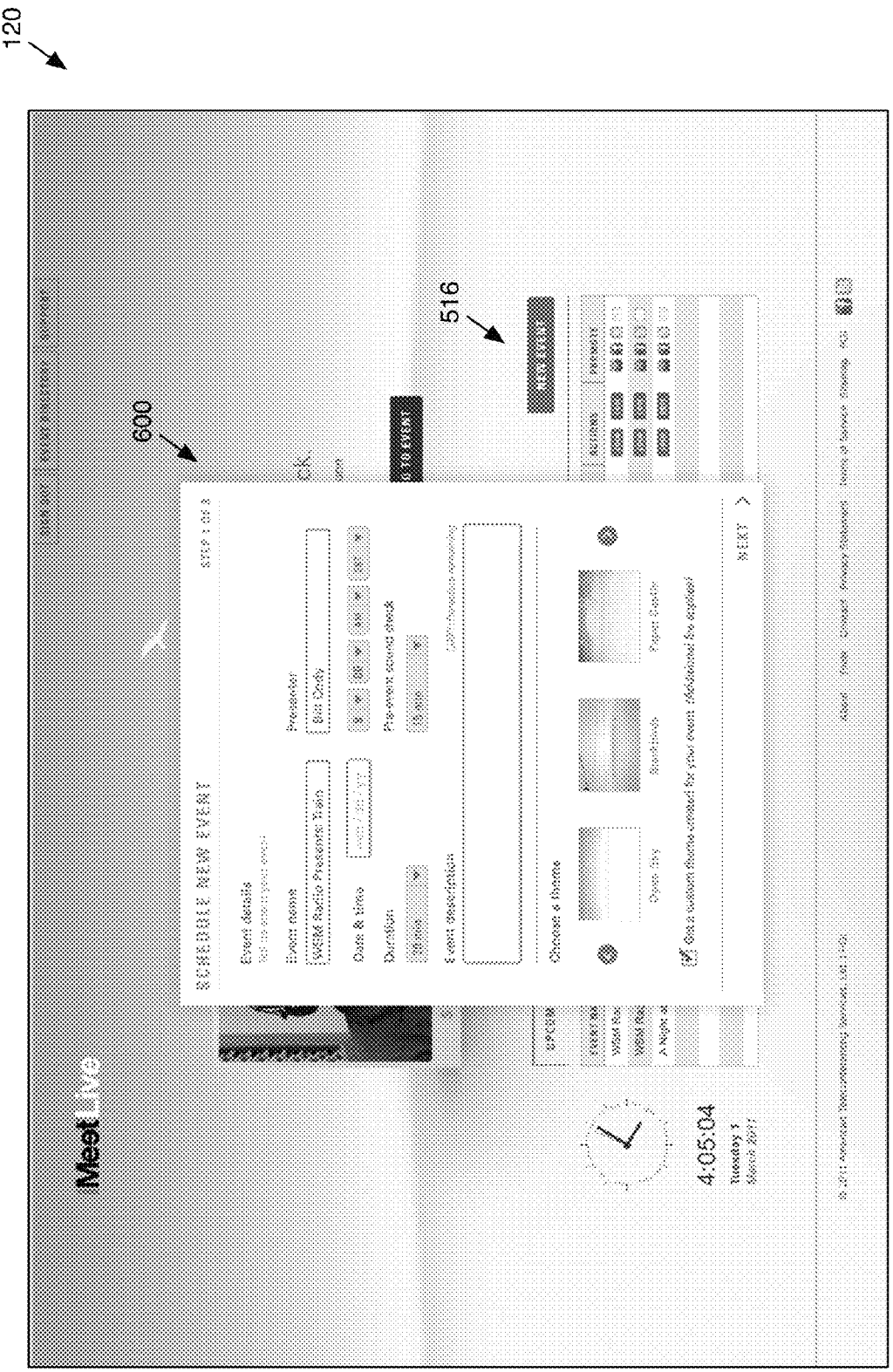
FIG. 6 illustrates a first configuration step for scheduling a new online event via the event production user interface of FIG. 5.
Figure 7:
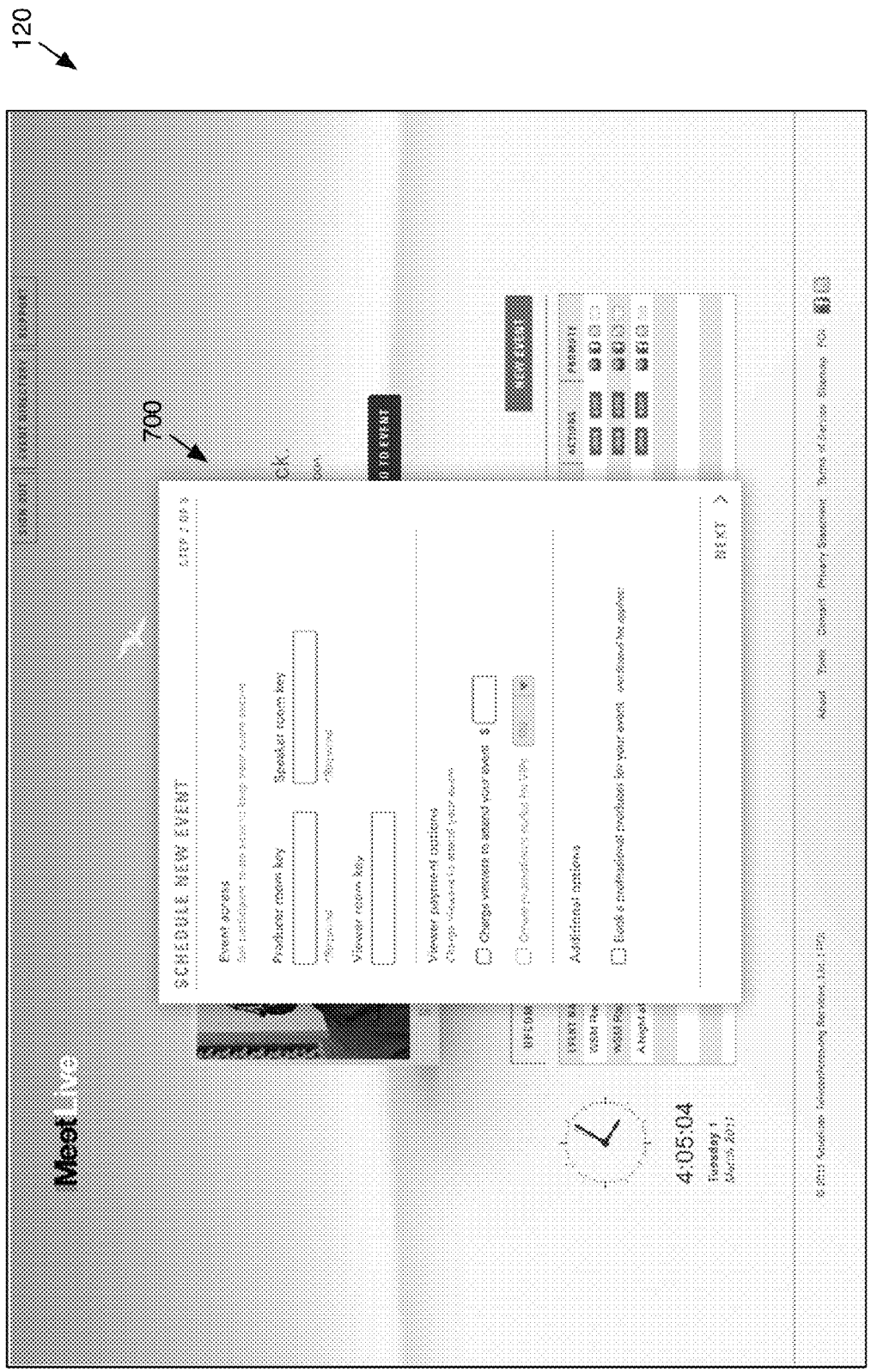
FIG. 7 illustrates a second configuration step for scheduling a new online event via the event production user interface of FIG. 5.
Figure 8:
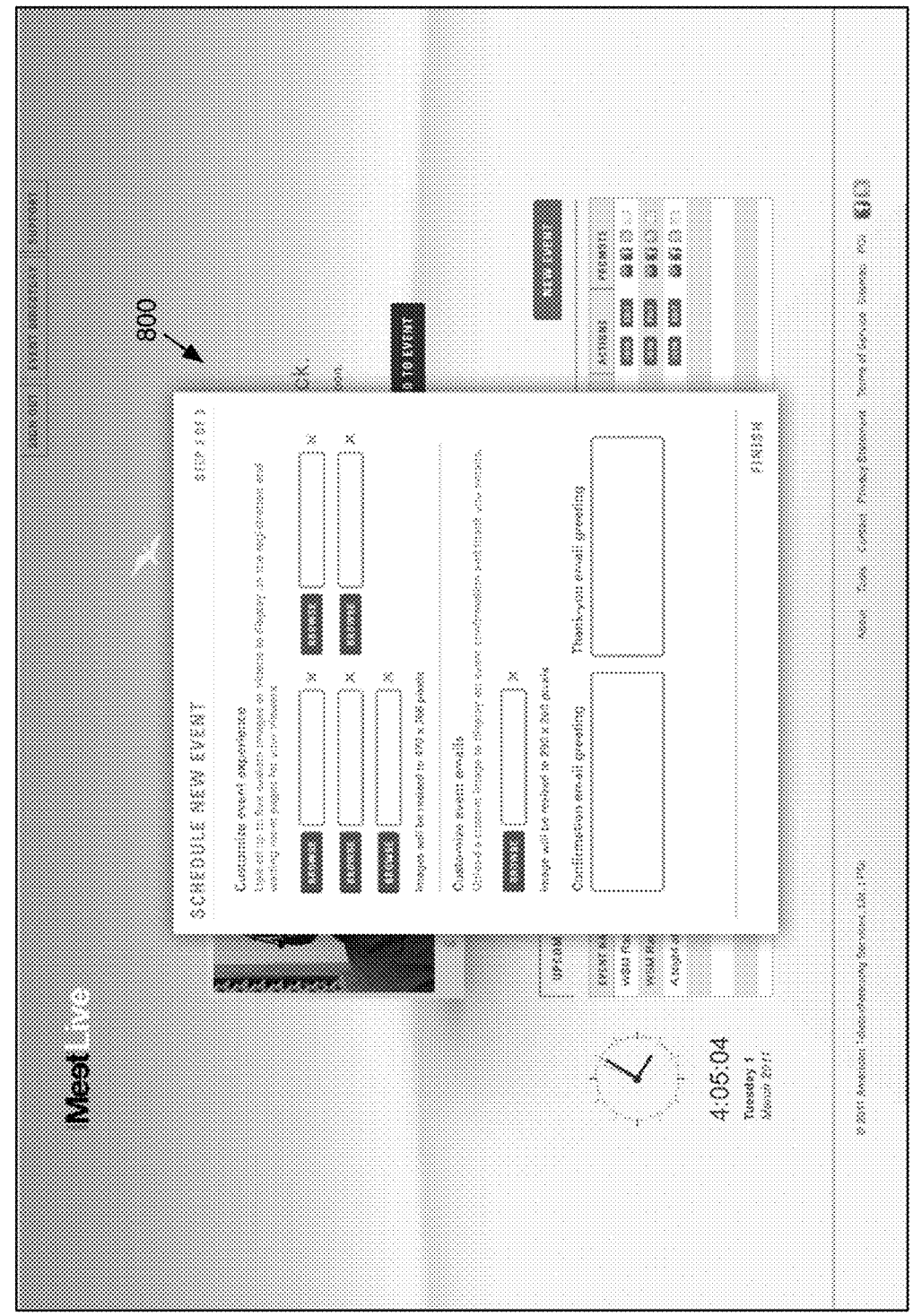
FIG. 8 illustrates a third configuration step for scheduling a new online event via the event production user interface of FIG. 5.

FIGS. 6-8 illustrate a series of exemplary screen shots for scheduling a new online event 111 via the event production user interface 120 (button 516). In this embodiment, the event producer 106 is taken through three steps for configuring various aspects of the online event. In step 1 (FIG. 6), the event producer is prompted to enter or configure parameters, such as, the event details, event description, event name, presenter, date/time, duration, pre-event sound check (a set time prior to beginning the online event 111), and a theme for the viewer user interface 124 or speaker user interface 122.

In step 2 (FIG. 7), the event producer 106 may configure security/access permissions for the online event 111 by specifying role-specific keys or passwords for the event producer 106, speakers 108, and viewers 110. The content provider may also control whether the online event 111 will be a free event, specify a charge to attend, or issue promotional codes. The content provider may also choose to hire a third party production company to manage and produce the online event 111. In step 3 (FIG. 8), the event producer 106 may customize the event experience by uploading, for example, custom images, videos, graphics, or other media to configure the viewer user interface 124 during or before the online event or, alternatively, to configure confirmation emails or other messages presented to registered viewers.

Figure 9:
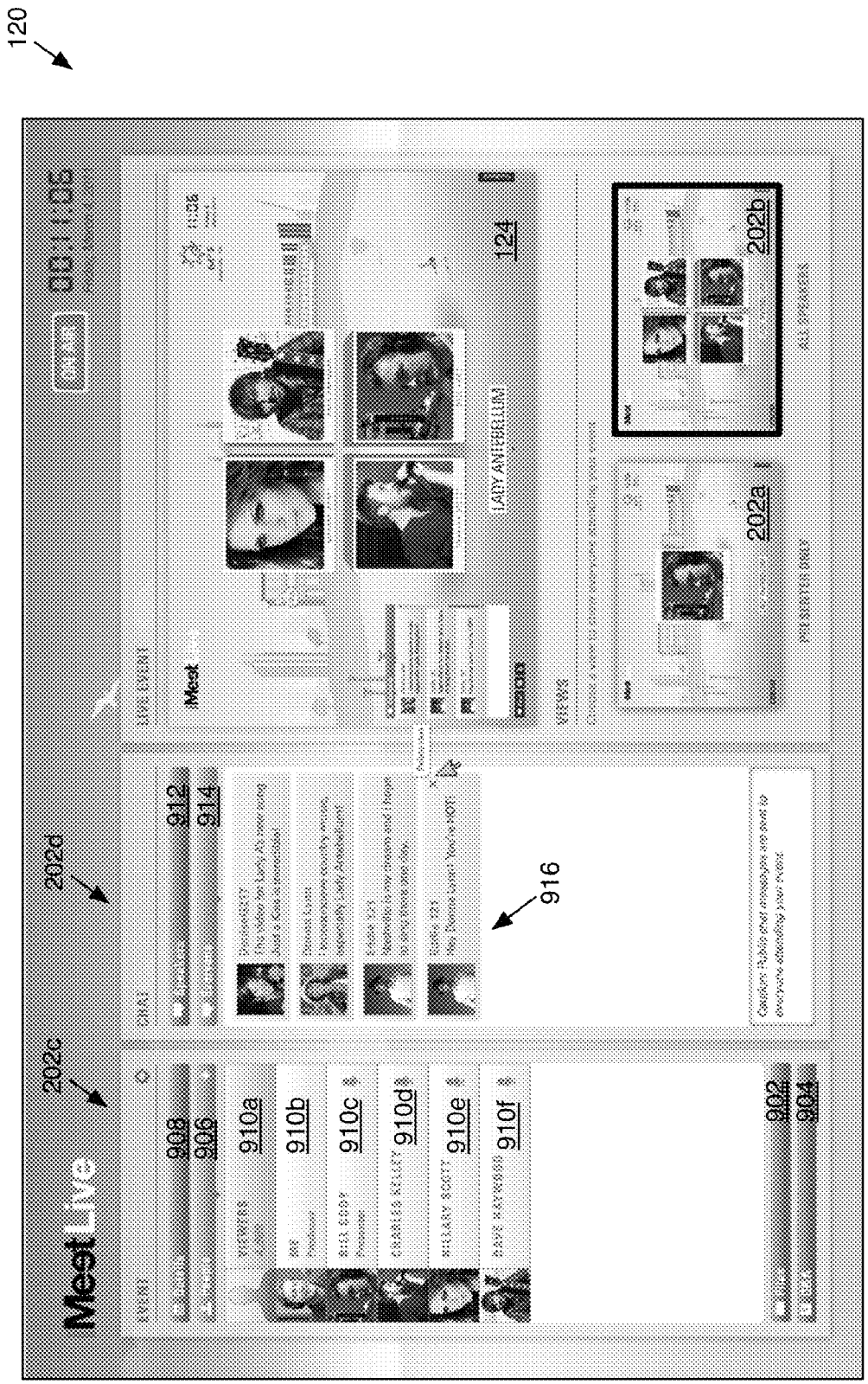
FIG. 9 is a user interface screen shot illustrating another embodiment of an event production user interface for enabling an event producer to selectively control views associated with the viewer user interface.
Figure 10:
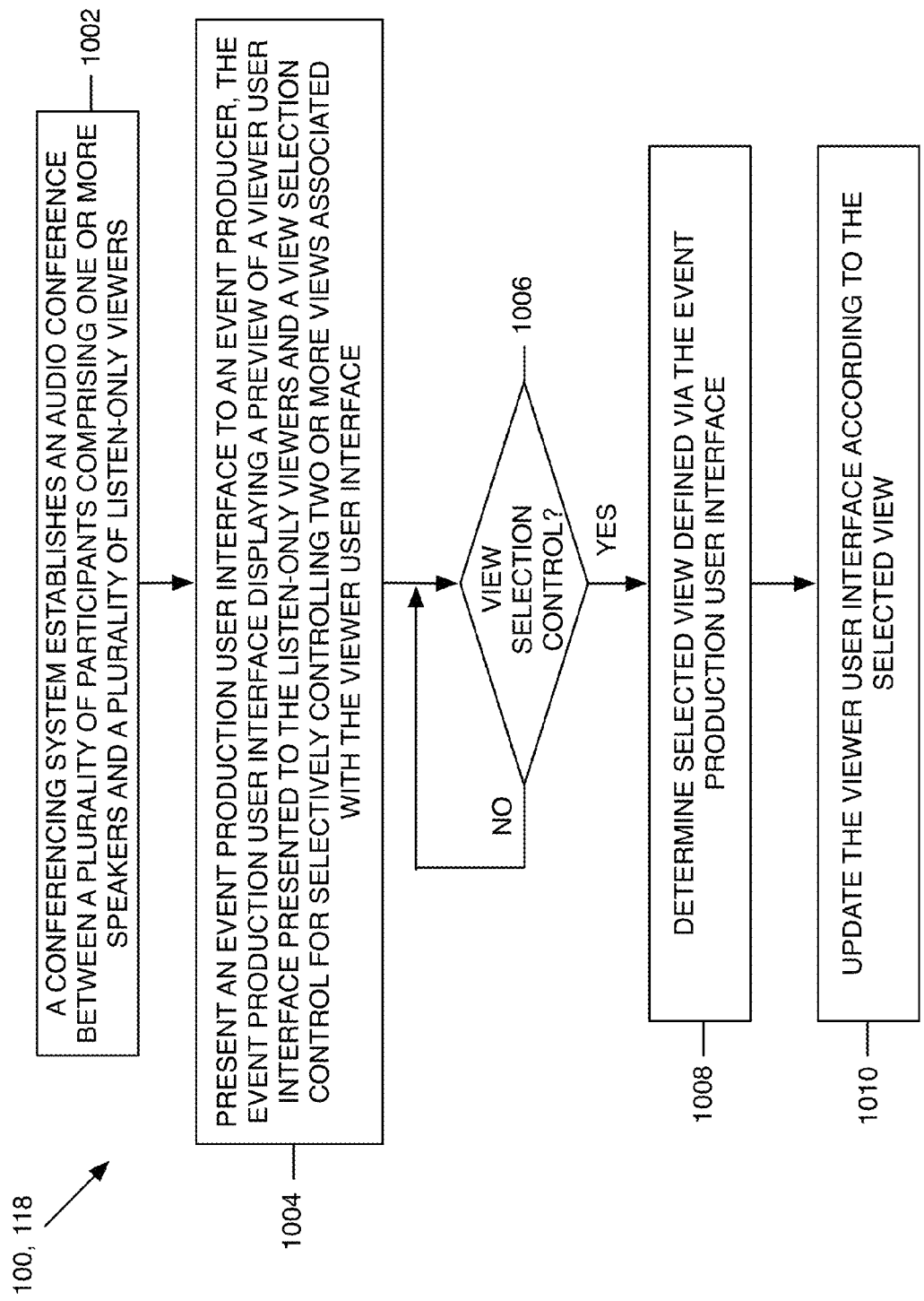
FIG. 10 is a flowchart illustrating an embodiment of the event management/production module(s) of FIGS. 1 & 2 for selectively controlling views associated with the viewer user interface via the event production user interface.
Figure 11:
FIG. 11 is a user interface screen shot illustrating an embodiment of the viewer user interface in which the event producer has selected an "all speakers" view.

FIGS. 9-11 illustrate an embodiment of a view selection control implemented via the event production user interface 120. In general, the view selection control enables the event producer 106 to selectively control, during the online event 111, which of a plurality of predetermined views are to be displayed to the viewers 110 in the viewer user interface 124. Referring to FIG. 9, the event production user interface 120 may simultaneously display the viewer user interface 124 and the various control components 202. An event control component 202c may comprise an interactive control panel for selectively accessing details about the online event (details bar 908) and interacting with a list of participants (people bar 906). When selected, the people bar 906 may display list items 910 identifying the participants by name and role (i.e., speaker, viewer, or event producer) with an optional avatar, icon, photograph, or other visual graphics. Where a large number of viewers 110 are participant, they may be grouped into a single item 910 with an indication of the number of current viewers. As described below in more detail, the event control component 202*c* may further comprise a file or media sharing bar 902 and a Q&A bar 904. The file sharing bar 902 enables the event producer 106 to produce content in the viewer user interface 124 during the online event 111, and the Q&A bar 904 enables the event producer 106 to manage questions submitted by the viewers 110.

A chat control component 202*d* may comprise a further interactive panel for controlling, managing, and moderating online chats or other messaging applications between the speakers 108 and/or the viewers 110. A speakers bar 912 exposes messages 916 exchanged during a speaker chat, and the everyone bar 914 exposes messages 916 submitted by the viewers 110.

View selection controls 202*a* and 202*b* provide a convenient production tool for enabling the event producer to selectively change predefined views associated with the viewer user interface 124. The views may customize any desirable presentation parameters. In the embodiment illustrated in FIG. 9, the view selection control 202*a* enables the event producer 106 to configure the viewer user interface 124 to display only the current speaker 108 in the online event 111. The view selection control 202*b* enables the event producer 106 to display all speakers 108. Regardless of the view, the displayed speakers 108 may be visually identified with corresponding participant objects 500, as described above.

In operation, the event producer 106 may select either of the view selection controls 202*a* and 202*b*. The event management/production modules 118 determine which view is selected in the event production user interface 120 and presents the corresponding view in the view user interface 124. FIG. 9 shows that the view selection control 202*b* has been selected. FIG. 11 illustrates the resulting view presented in the viewer user interface 124, in which all four speakers 108 are identified with a corresponding participant object 1104*a*, 1104*b*, 1104*c*, and 1104*d*. As further illustrated in FIG. 11, the viewer user interface 124 may also display other information about the online event 111 (e.g., an event title 1102), current date/time, and other information customized to the particular viewer 110 (e.g., local weather, news, etc.). As described below in more detail, the viewer user interface 124 may also present user interface components for accessing various conferencing features, such as, for example, a viewer chat (chat component 1106), a question submission component 1110 for submitting questions to the event producer 106, and a social networking component 1112 for interacting with a social networking feed associated with the online event 111.*s*

FIG. 10 illustrates the architecture, operation, and/or functionality of an embodiment of the event management/production modules 118 for implementing the view selection control. At block 1002, the conferencing system 102 establishes an audio conference 112 between one or more speakers 108, the event producer 106, and a plurality of viewers 110 accessing the conferencing system 102 via computing devices 104 connected to network(s) 106. At block 1004, the conferencing system 102 and/or servers 114 present the event production user interface 120 to the event producer 106. The event production user interface 120 may simultaneously display the viewer user interface 124 and the view selection control components 202*a* and 202*b* (FIGS. 2 & 9). At decision block 1006, the event management/production modules 118 determine whether the current view is to be changed to a new view. If the event producer 106 initiates a change to a new view or otherwise changes presentation parameters associated with the viewer user interface 124, the event management/production modules 118 determine the selected new view or presentation parameters (block 1008) and updates the viewer user interface 124 accordingly (block 1010).

Figure 12:
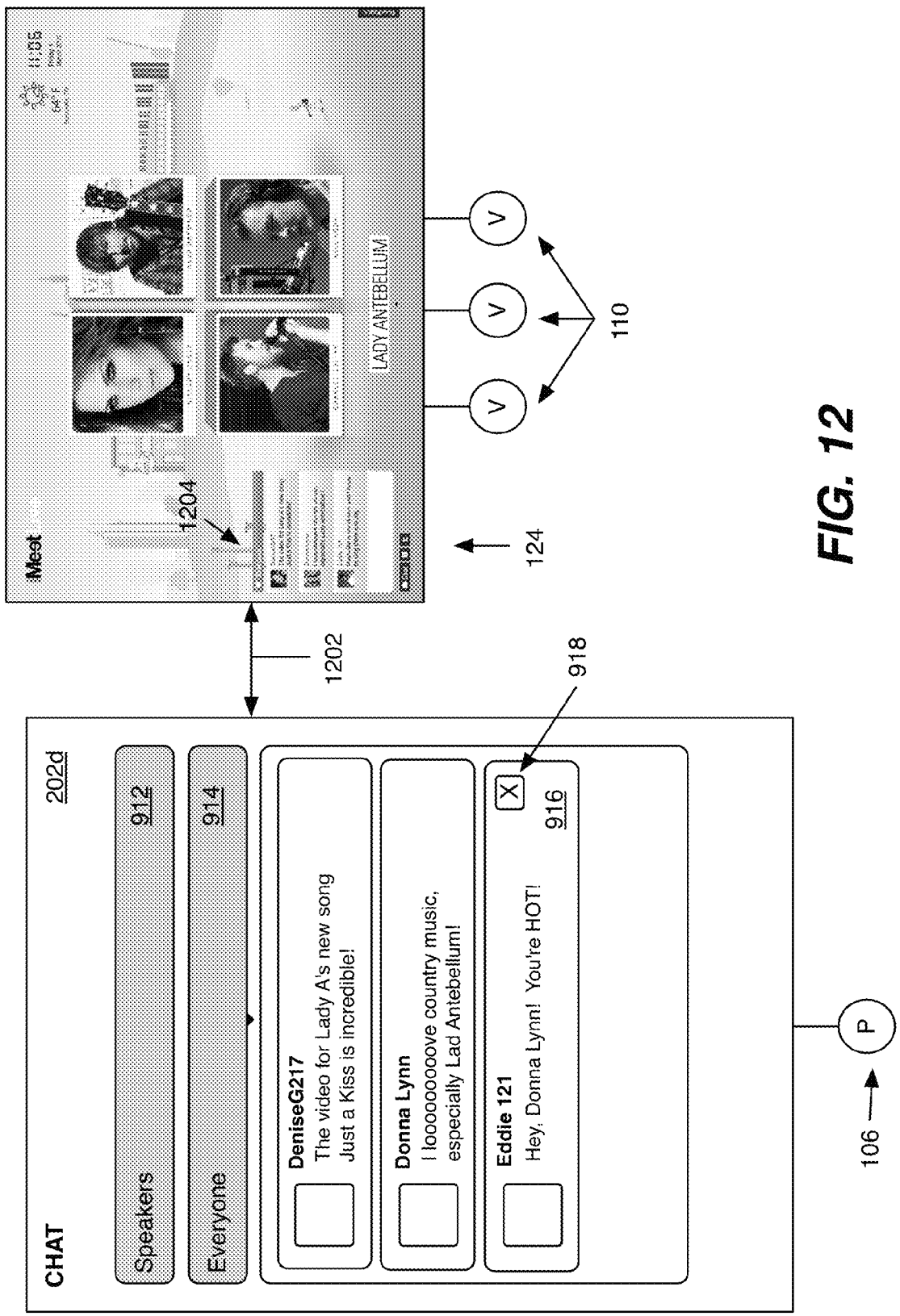
FIG. 12 illustrates an embodiment of a chat moderation control implemented via the event production user interface.
Figure 20:
FIG. 20 is a user screen shot illustrating an embodiment of a speaker user interface provided to speakers participating in the online event.

FIGS. 12 & 20 illustrate a more detailed view of the chat control component 202*d* and the operation of the associated features for moderating a viewer or speaker chat. FIG. 12 illustrates a viewer chat panel 1204 that may be launched from the chat component 1106. The viewer chat panel 1204 enables viewers 110 to interact with each other by submitting text or other messages via the conferencing system 102 or other systems, such as, a social networking computer system. FIG. 20 illustrates an embodiment of a speaker user interface 122 for enabling speakers 108 to exchanges messages either with each other, the viewers 110, or any combination thereof. The speaker user interface 122 may include a speaker chat panel 2002 (FIG. 20), which may be selectively displayed via a chat button 1106. The speaker chat panel 2002 may separately display a speaker chat application (speaker bar 2004) and a public chat application (everyone bar 2003). Referring again to FIG. 12, the event production user interface 120 may maintain a communication channel 1202 for receiving and displaying the messages 916 submitted by the speakers 108 (speakers bar 912) and the viewers 110 (everyone bar 914). The event producer 106 may moderate either chat by, for example, deleting inappropriate messages 916 via, for example, a delete button 918.

Figure 13:
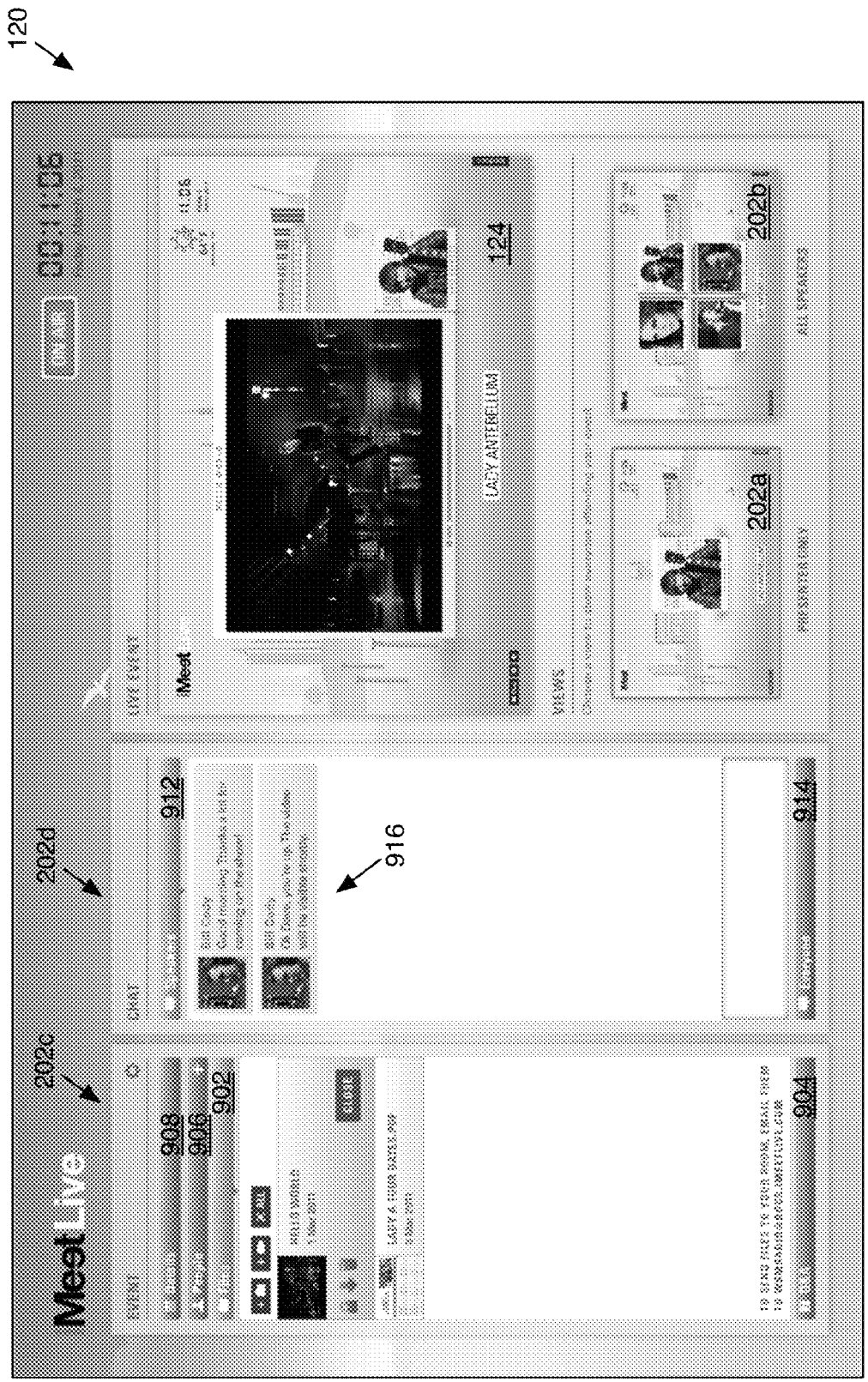
FIG. 13 is a user interface screen shot illustrating an embodiment of the event production user interface for enabling the event producer to selectively define and share media files to be presented to the viewer user interface during the online event.
Figure 14:
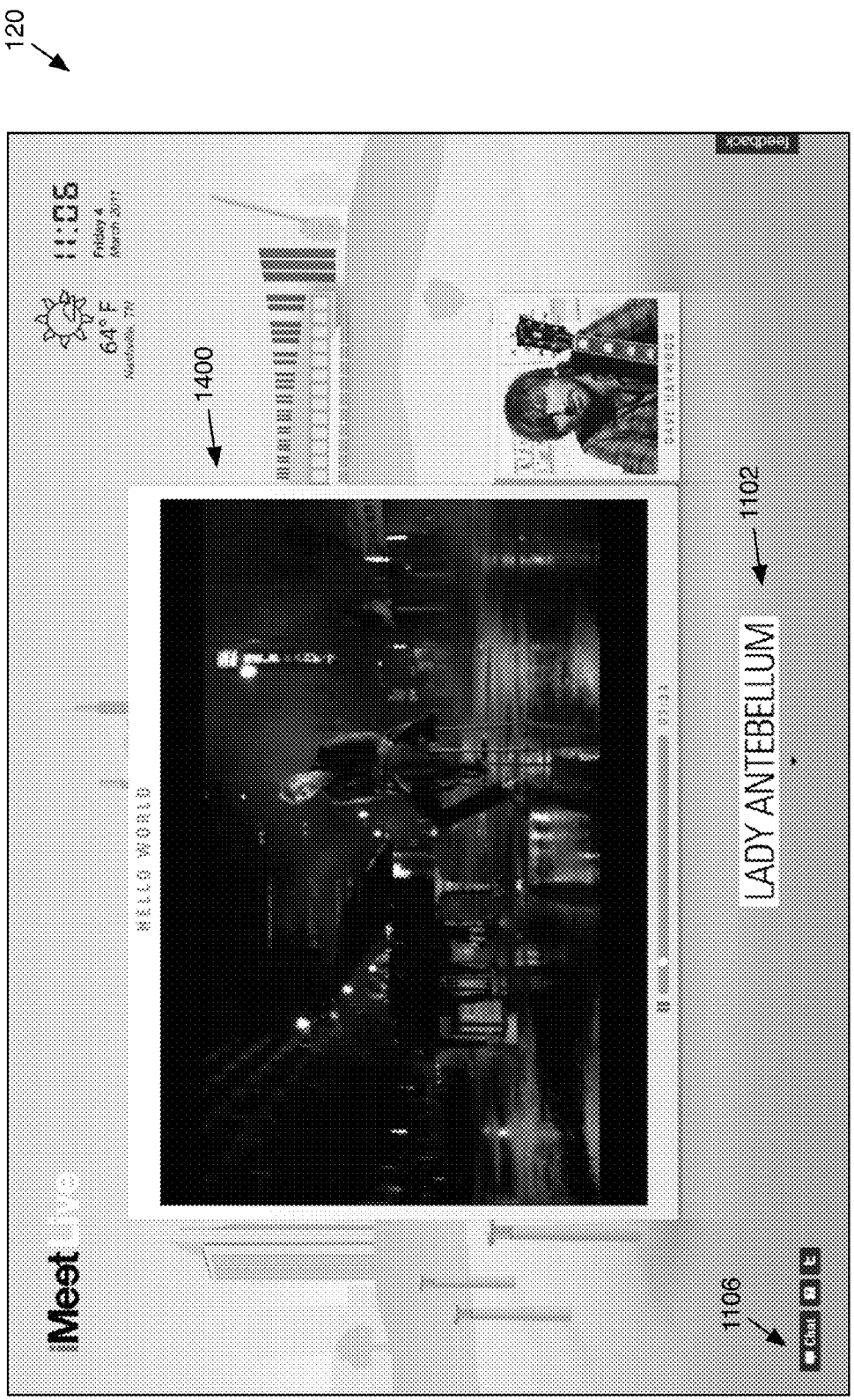
FIG. 14 illustrates an embodiment of the viewer user interface after the event producer has shared a media file.
Figure 15:
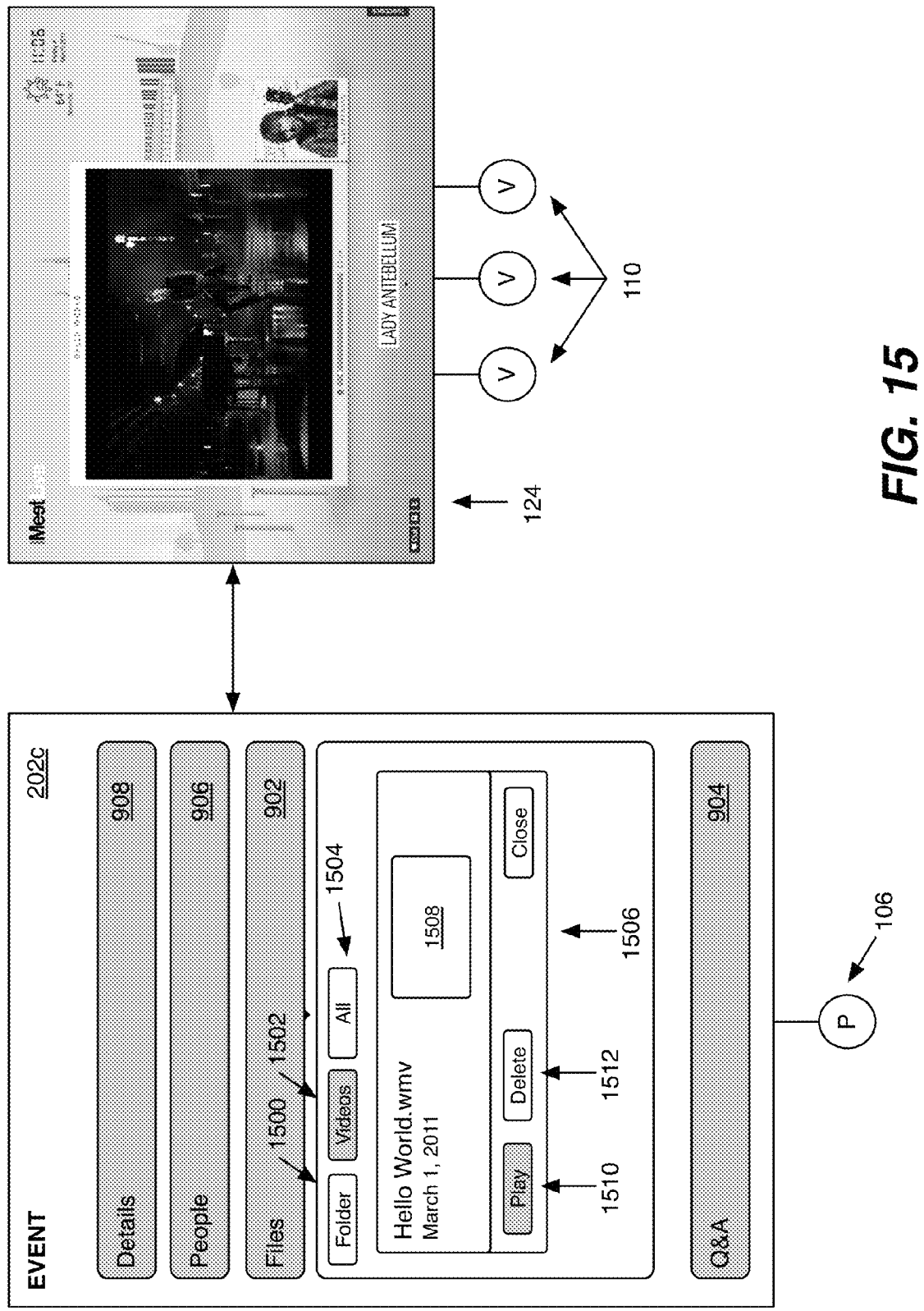
FIG. 15 illustrates an embodiment of the media sharing control provided via the event production user interface.

FIGS. 13-16 illustrate an embodiment of a file or media sharing control implemented via the event production user interface 120. FIGS. 13 & 15 illustrate the file sharing bar 902 expanded to present control functions for enabling the event producer 106 to specify content to be presented in the viewer user interface 124 during the online event 111. As best illustrated in FIG. 15, the event producer 106 may search or browse for media stored in a local or remote folder (folder button 1500) or, alternatively, view all available media files (all button 1504) or according to type (e.g., video button 1502). In FIG. 15, the video button 1502 has been selected to display a media file 1506 available for presentation in the viewer user interface 124. It should be appreciated that the media file 1506 may comprise any type of media, such as, text, graphics, video, or audio in any desirable format (e.g., documents, presentations, videos, images, etc.). The media file 1506 may be displayed with a corresponding thumbnail image 1508 along with a play button 1510 and a delete button 1512. To produce the media to the viewer user interface 124, the event producer 106 may select the play button 1510. In response to selection of the play button 1510, the applicable media file 1506 may be automatically presented to the viewer user interface 124 (FIGS. 14 & 15).

Figure 16:
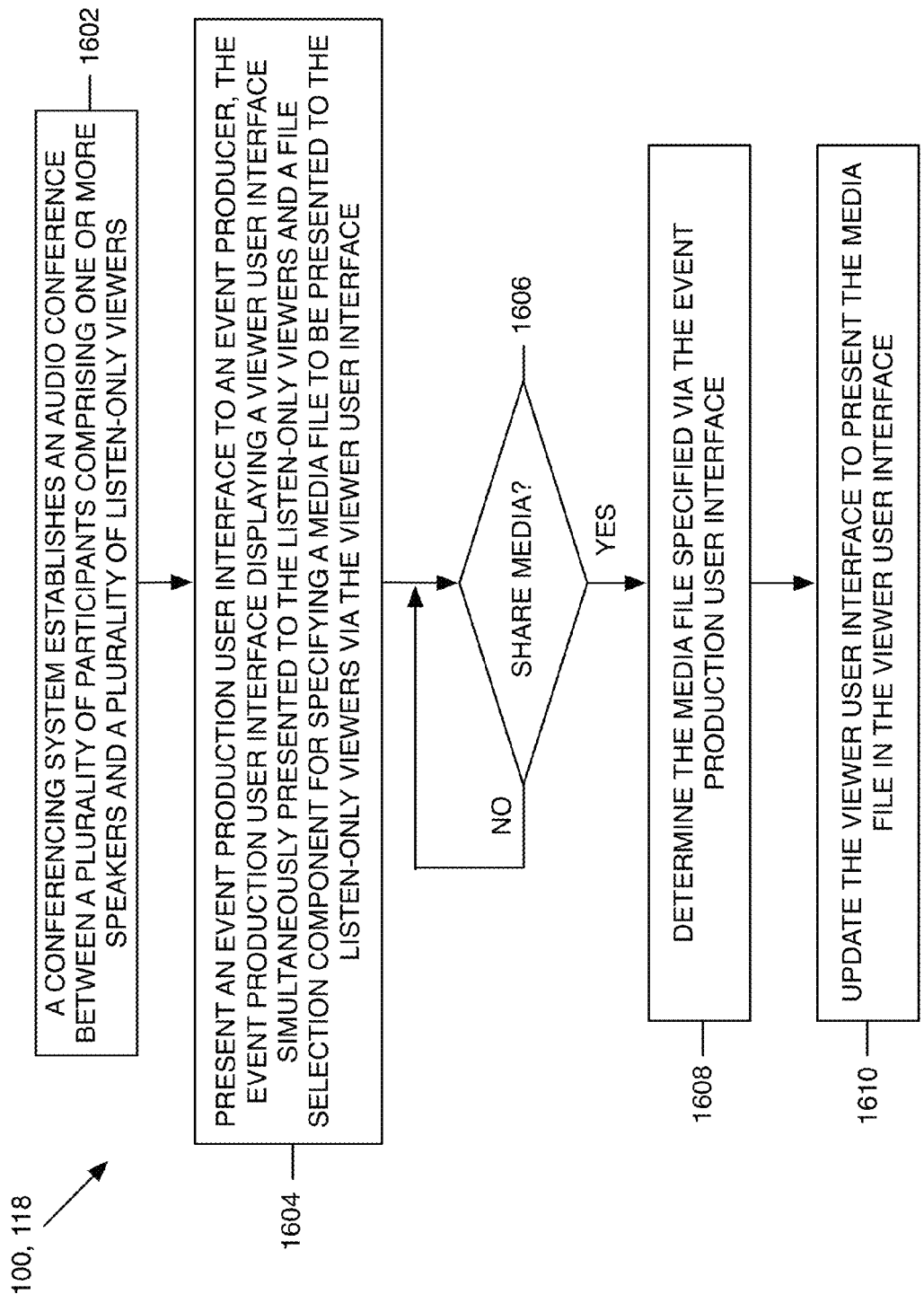
FIG. 16 is a flowchart illustrating an embodiment of the event management/production module(s) of FIGS. 1 & 2 for implementing the media sharing control of FIG. 15.

FIG. 16 illustrates the architecture, operation, and/or functionality of an embodiment of the event management/production modules 118 for implementing the media sharing control. At block 1602, the conferencing system 102 establishes an audio conference 112 between one or more speakers 108, the event producer 106, and a plurality of viewers 110 accessing the conferencing system 102 via computing devices 104 connected to network(s) 106. At block 1604, the conferencing system 102 and/or servers 114 present the event production user interface 120 to the event producer 106 and the viewer user interface 124 and the speaker user interface 122 to the viewers 110 and speakers 108, respectively. The event production user interface 120 may simultaneously display the viewer user interface 124 and a file sharing bar 902. At decision block 1606 and block 1608, the event management/production modules 118 determines the media file 1506 identified by the event producer 106 via the event production user interface 120. At block 1610, in response to the command initiated by the event producer 106, the event management/production modules 118 present the media file 1506 in the viewer user interface 124.

Figure 17:
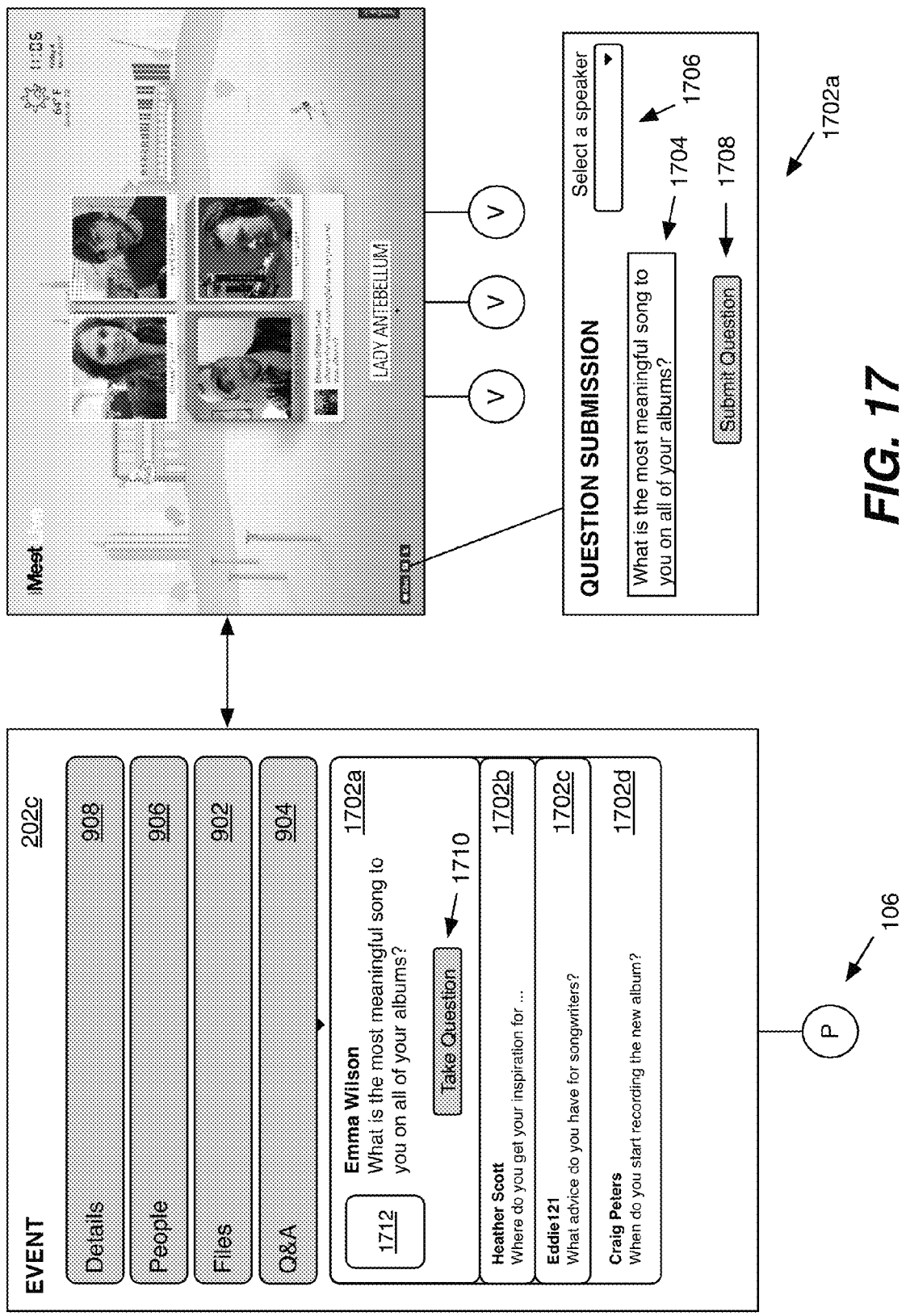
FIG. 17 illustrates an embodiment of a Q&A management control provided via the event production user interface.
Figure 18:
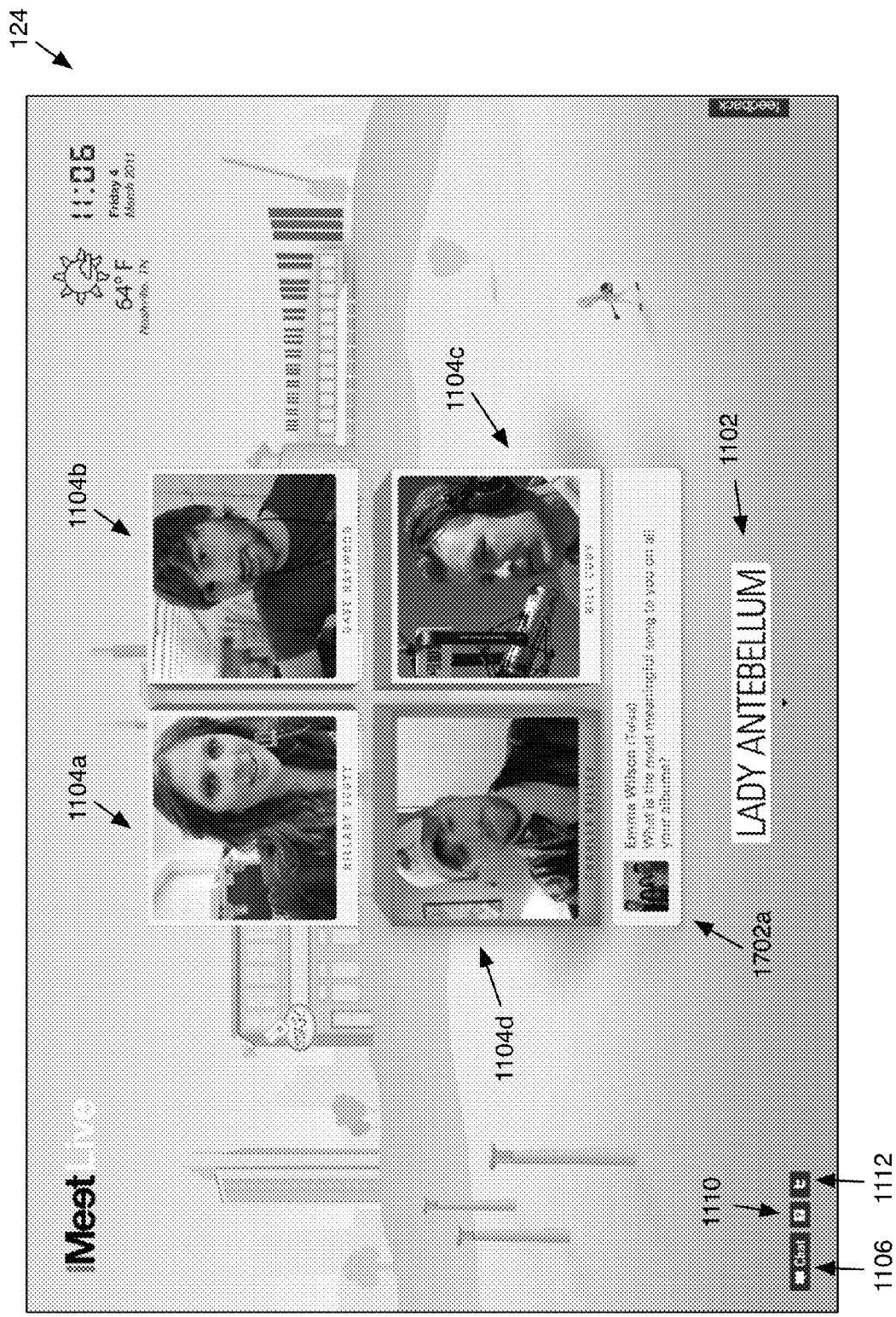
FIG. 18 illustrates an embodiment of the viewer user interface after the event producer has selected a question submitted by one of the viewers.
Figure 19:
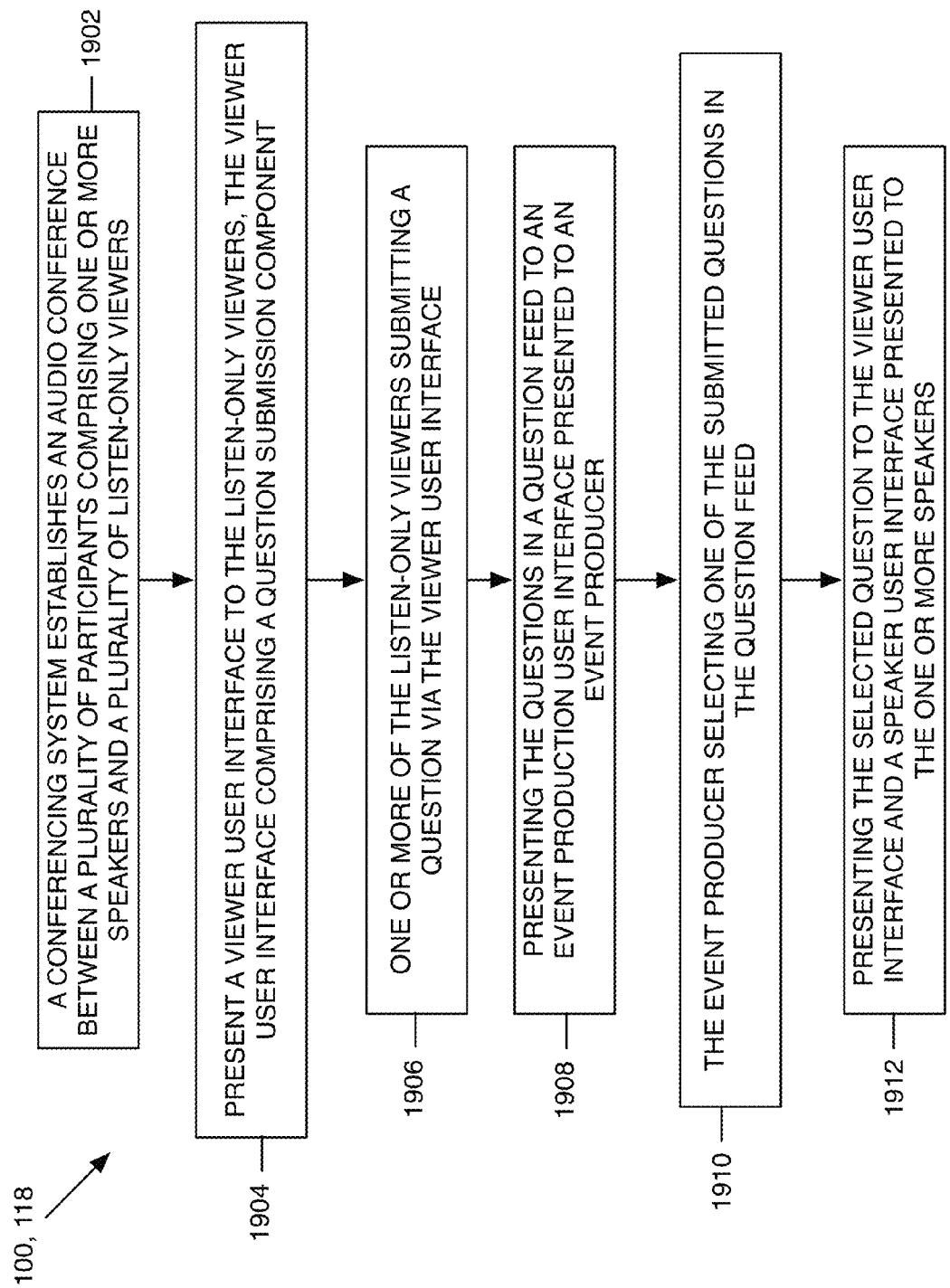
FIG. 19 is a flowchart illustrating an embodiment of the event management/production module(s) of FIGS. 1 & 2 for implementing the Q&A management control of FIG. 17.

FIGS. 17-19 illustrate an embodiment of a question submission/management control implemented via the event production user interface 120 and the viewer user interface 124. In operation, the viewers 110 may launch a question submission panel 1702 by selecting the question submission component 1110. As illustrated in FIG. 17, viewers 110 may insert a question into a text box 1704, select a target speaker 108 for the question (drop-down box 1706), and submit the question to the conferencing system 102 (button 1708). Submitted questions may be displayed in the event production user interface 120 under the Q&A bar 904. The questions may be displayed as a scrollable feed. The event producer 106 may navigate the feed and select a particular question (question 1702a in FIG. 17). When selected, the question may be expanded to display the identity of the viewer (thumbnail 1712), the text of the question, and prompt the event producer 106 to "take the question" (button 1710). If the event producer 106 "takes" the question by selecting button 1710, the question 1702a is then presented in the online event 111 by displaying in the viewer user interface 124.

FIG. 19 illustrates the architecture, operation, and/or functionality of an embodiment of the event management/production modules 118 for implementing the question submission/management control. At block 1902, the conferencing system 102 establishes an audio conference 112 between one or more speakers 108, the event producer 106, and a plurality of viewers 110 accessing the conferencing system 102 via computing devices 104 connected to network(s) 106. At block 1904, the conferencing system 102 and/or servers 114 present the view user interface 124 to the viewers 110. At block 1906, one or more viewers 110 submit questions via the viewer user interface 124. At block 1908, the submitted questions are presented in the event production user interface 120 to the event producer 106. At block 1910, the event producer 106 may browse and select one of the submitted questions for presentation in the viewer user interface 124 (block 1912).

Figure 21:
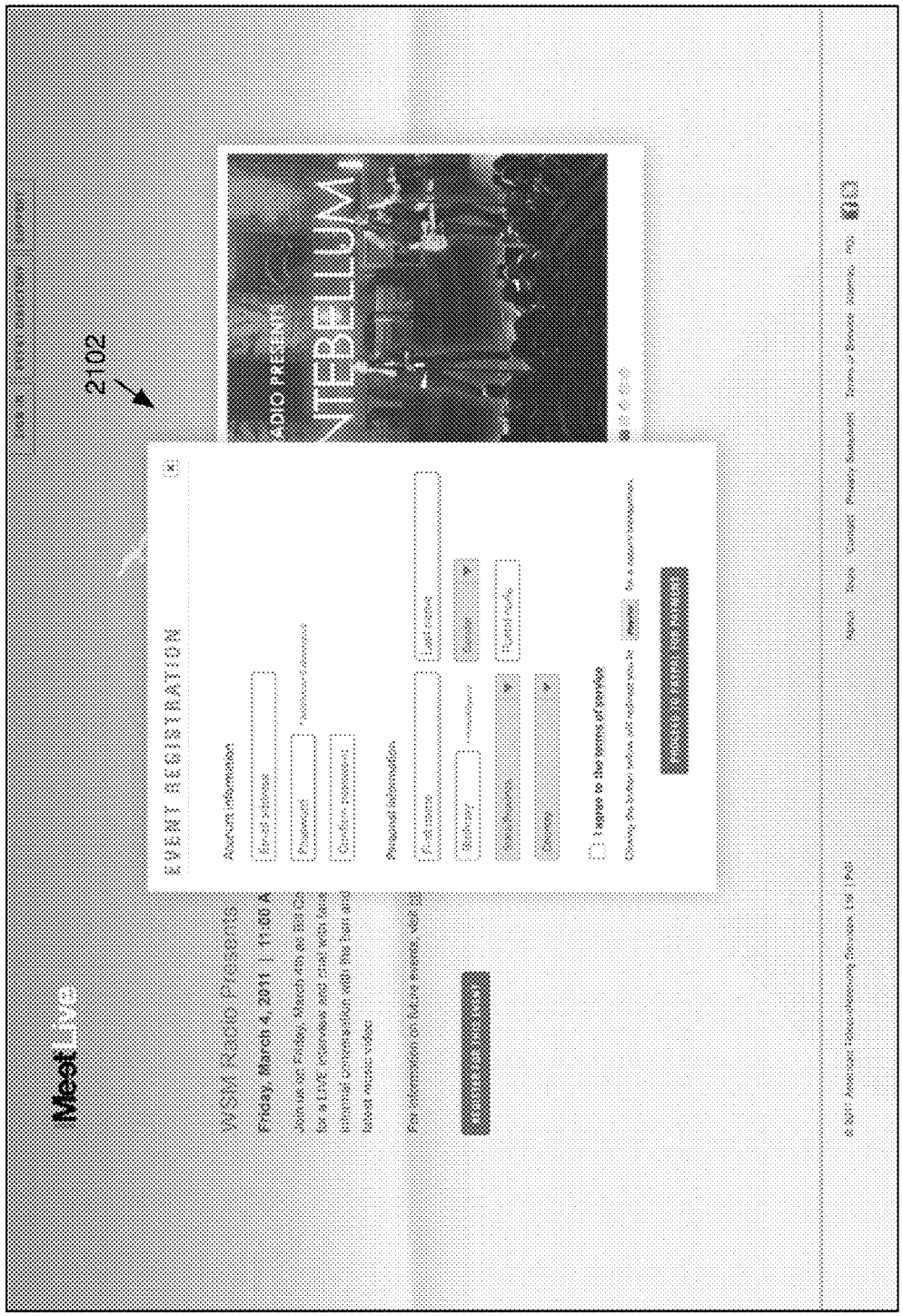
FIG. 21 is an event registration screen displayed in a viewer user interface.
Figure 22:
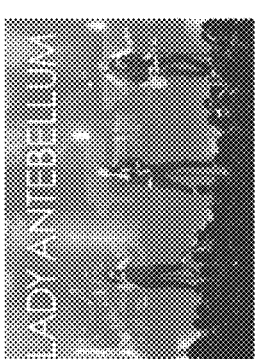
FIG. 22 illustrates an exemplary confirmation email after a viewer has registered for an online event.

FIG. 21 illustrates an embodiment of the viewer user interface 124 for enabling viewers 110 to register for an online event 111. The event producer 106 may promote the online event 111 through social networking channels or by other means (e.g., email, SMS, etc.). The message may include a link to an event registration page associated with the viewer user interface 124. The event registration page may include promotional information about the online event, date/time, and an event registration panel 2102 prompting the viewer 110 to specify account information, personal information, and payment information (if the event has a fee) for registering for the event. After registering for the online event 111, a confirmation email or other message 2200 (FIG. 22) may be sent to the viewer 110. The confirmation message 2200 may include additional information 2202 to promote the online event 111.

Figure 23:
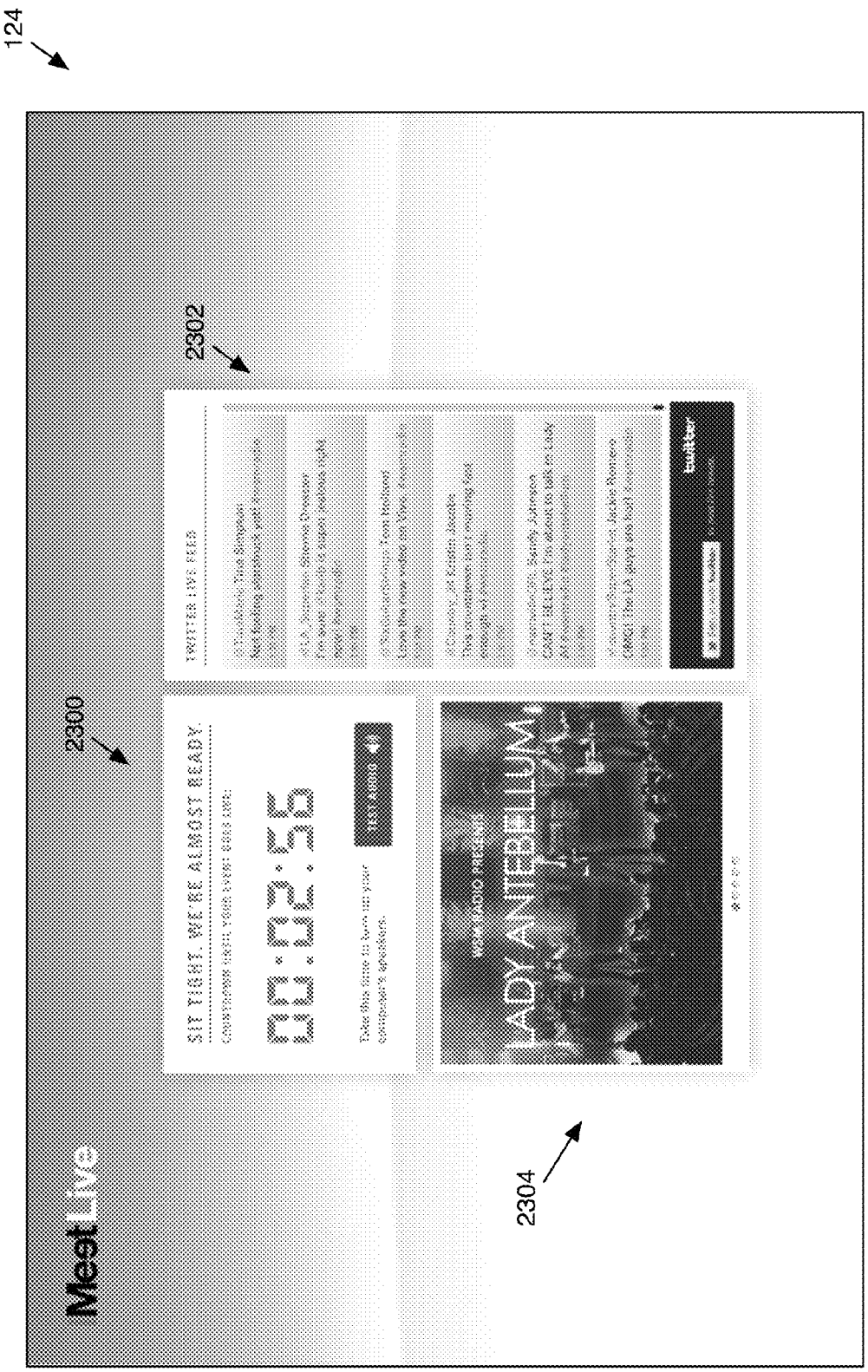
FIG. 23 illustrates an embodiment of a "waiting room" functionality provided via the viewer user interface before an online event begins.

FIG. 23 illustrates an embodiment of a "waiting room" that may be displayed via the viewer user interface 124 if the viewer 110 joins the online event 111 prior to the scheduled start time. To enhance the user experience, the "waiting room" may include a social networking panel 2302 for enabling early attendees to interact and discuss the upcoming online event 111. The "waiting room" may include a countdown timer panel 2300 indicating when the online event 111 goes live. A further panel 2304 may present additional promotional information (e.g., introductory or teaser videos or any other information).

Figure 24:
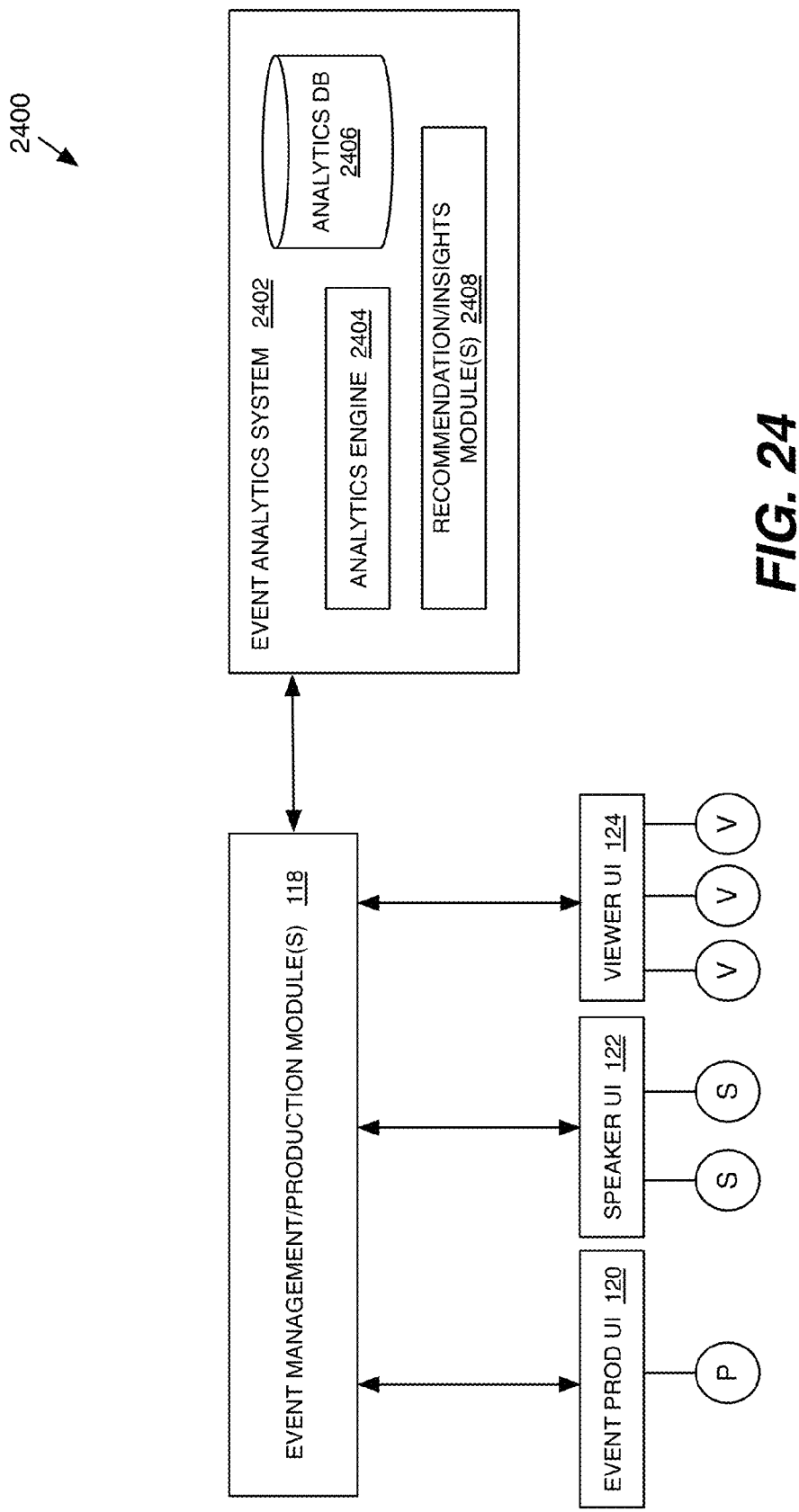
FIG. 24 is a block diagram illustrating another embodiment of a system comprising the event management/production modules for incorporating event analytics.

FIG. 24 illustrates an embodiment of a system 2400 for configuring, managing, and/or producing online events 111 using analytical data associated with an existing or previous online events 111 ("analytics"). System 2400 may be generally configured in the manner described above in connection with FIGS. 1-23. System 2400 comprises an event analytics system 2402 in communication with the event management/production module(s) 118. The event analytics system 2402 comprises an analytics engine 2404, an analytics database 2406, and recommendations/insights module(s) 2408. The analytics engine 2404 monitors, tracks, or otherwise obtains data from the event management/production module(s) 118, the conferencing system 102, and/or the server(s) 114. The data may be stored in the database 2406 and processed before, during and/or after an online event 111 by the recommendation/insights module(s) 2408.

It should be appreciated that the analytics may comprise various types of data related to an online event 111. In the embodiment illustrated in FIG. 25, the analytics engine 2404 may be configured to receive event data 2502, participant data 2504, and applications data 2506. The event data 2502 may comprise any suitable data related to, for example, event registration, event attendance, etc. The participant data 2504 may comprise more detailed analytical data related to the speakers and viewers, including, for example, demographic data, behavioral data, and psychographic data. The participant data 2504 may be obtained from profiles 116 maintained by the conferencing system 102 or remote profiles hosted by, for example, a social networking system and/or a customer relationships management (CRM) system, which may be accessed via an application program interface (API). The applications data 2506 may comprise usage or other data related to one or more applications supported by the conferencing system 102 and provided during the online events 111.

Figure 26:
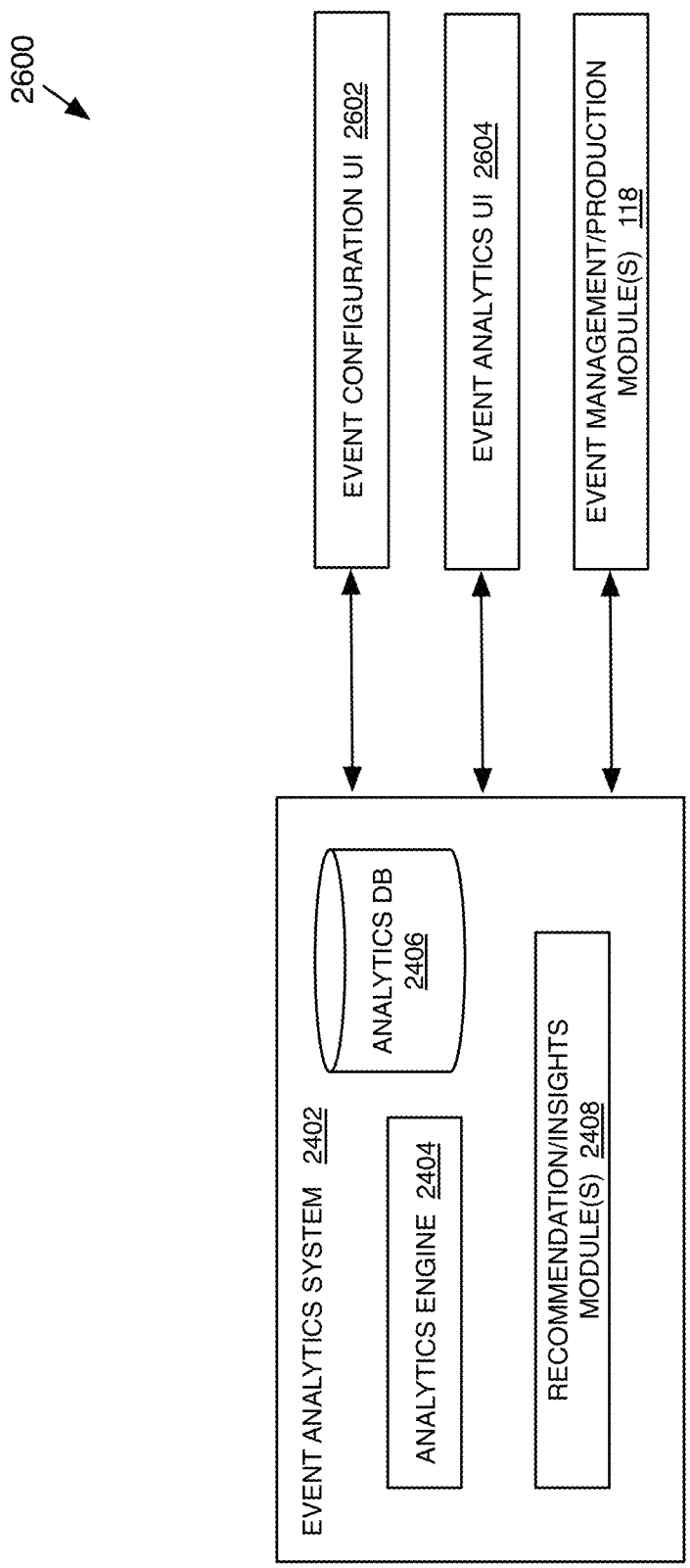
FIG. 26 illustrates various user interfaces for accessing the event analytics system of FIG. 24.

The analytics engine 2404 may process the analytics, store them in the database 2406, and distribute them to users or otherwise make them available for download for further processing and/or analysis. The recommendation/insights module(s) 2408 may process the analytics from the current online event 111 and transmit production recommendation(s) 2508 to the event producer 106 via the event management/production module(s) 118. It should be appreciated that real-time and in-event production recommendations 2508 may enhance the production value of the online event 111. As further illustrated in FIG. 26, the production recommendation (s) 2408 may also be provided to an event configuration user interface 2602 before an online event 111 is scheduled to begin for pre-event analysis, promotions, optimizations, etc. or provided to an event analytics user interface 2604 for post-event analysis, promotions, optimizations, etc.

Figure 27:
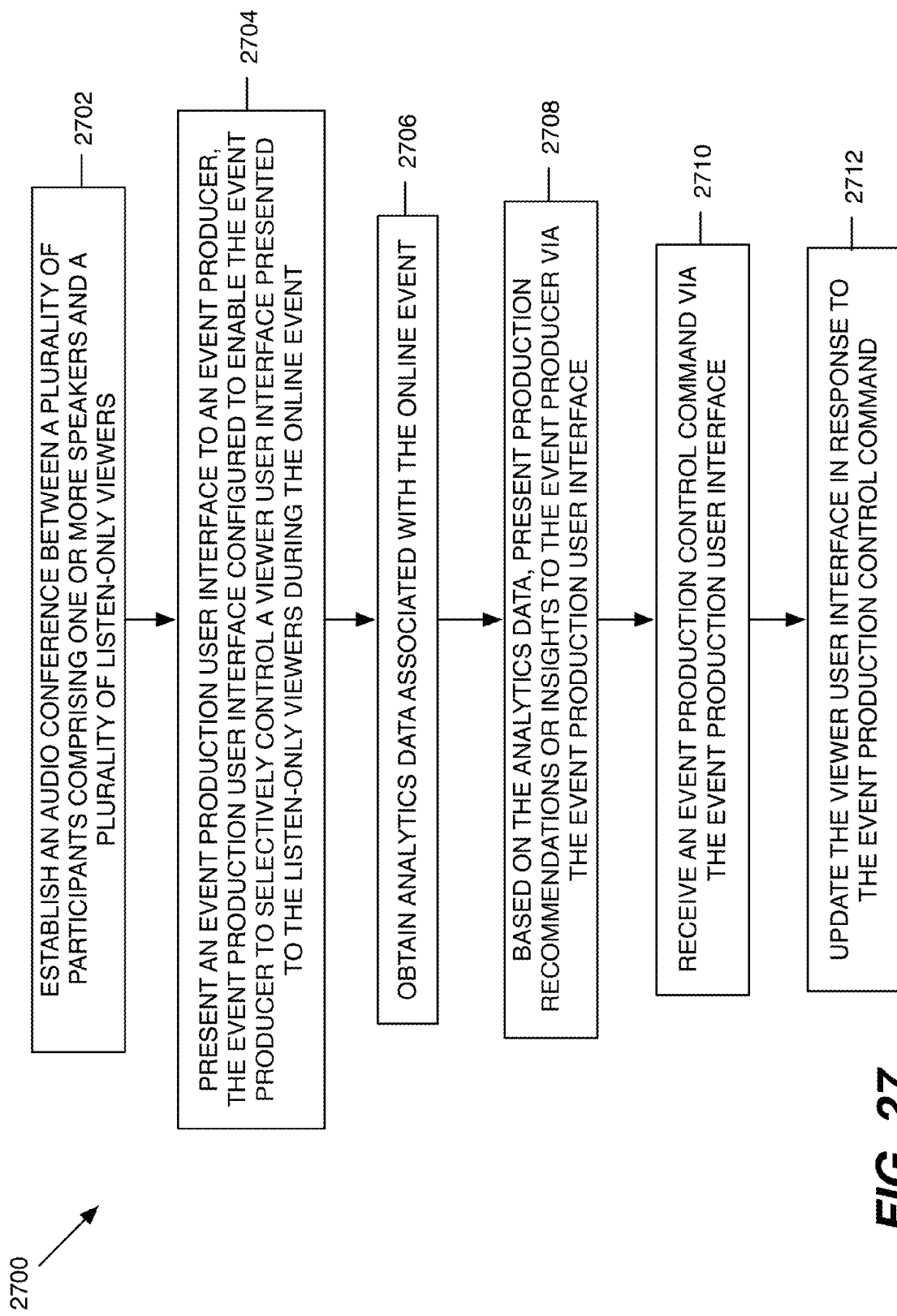
FIG. 27 is a flowchart illustrating an embodiment of a method for producing an online event using event analytics.

FIG. 27 illustrates an embodiment of method 2700 for producing an online event 111 using event analytics. At block 2702, an audio conference 112 is established between a plurality of participants comprising one or more speakers 108 and a plurality of listen-only viewers 110. At block 2704, an event production user interface 120 is presented to an event producer 106. The event production user interface 120 is configured to enable the event producer 106 to selectively control a viewer user interface 124 presented to the listen-only viewers 110 during the online event 111. At block 2706, the analytics engine 2404 obtains analytics data from the event management/production module(s) 118 (e.g., event data 2502, participant data 2504, applications data 2506, etc.). Based on the analytics data, at block 2708, production recommendations or insights may be presented to the event producer 106 via the event production user interface 124. The production recommendations may be implemented with any desirable user interface components or controls for enabling the event producer to accept the recommendation. For example, at block 2710, the event management/production module(s) 118 may receive an event production control command associated with a production recommendation 2508. In response to the event production control command, at block 2712, the viewer user interface 124 may be updated in accordance with the production recommendation 2508. As an example, the analytics engine 2404 may determine that a relatively significant portion of the viewers 110 have mentioned a particular topic or issue via a social networking feed or in a public or private chat. In response, the production recommendation 2508 may include a prompt to have the speakers 108 address the topic or issue.

Figure 28:
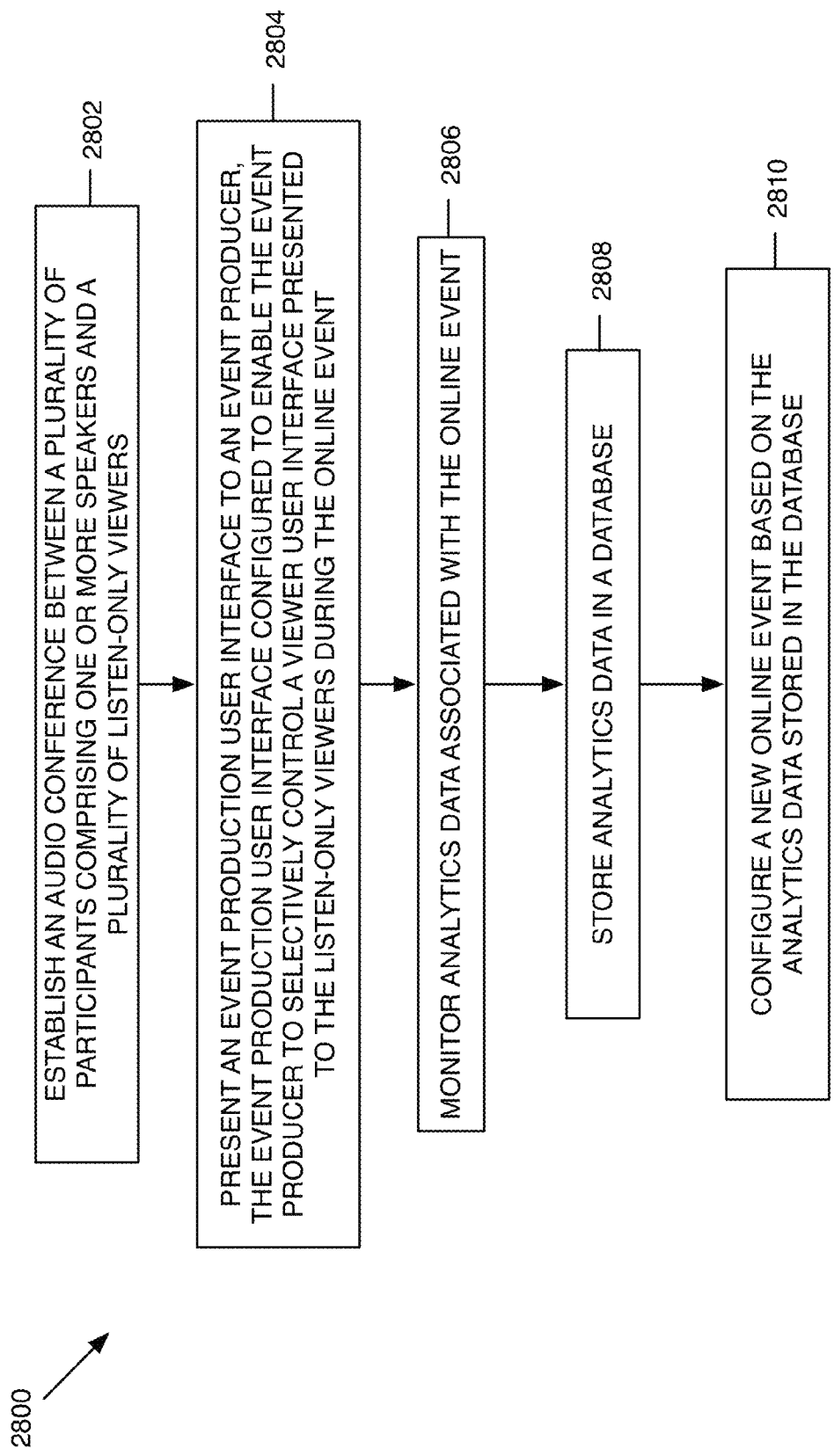
FIG. 28 is a flowchart illustrating an embodiment of a method for configuring an online event based on event analytics.

FIG. 28 illustrates an embodiment of method 2800 for configuring a new online event 111 using event analytics. At block 2702, the audio conference 112 is established between the speaker(s) 108 and the listen-only viewers 110. At block 2704, the event production user interface 120 is presented to the event producer 106. At block 2806, the analytics engine 2404 monitors and obtains data associated with the current online event 111. At block 2808, the analytics data is stored in the database 2406 to be reviewed and/or downloaded by the event producer. At block 2810, a new online event 111 may be configured (e.g., via the event configuration user interface 2602) based on the analytics data stored in the database 2406.

Figure 25:
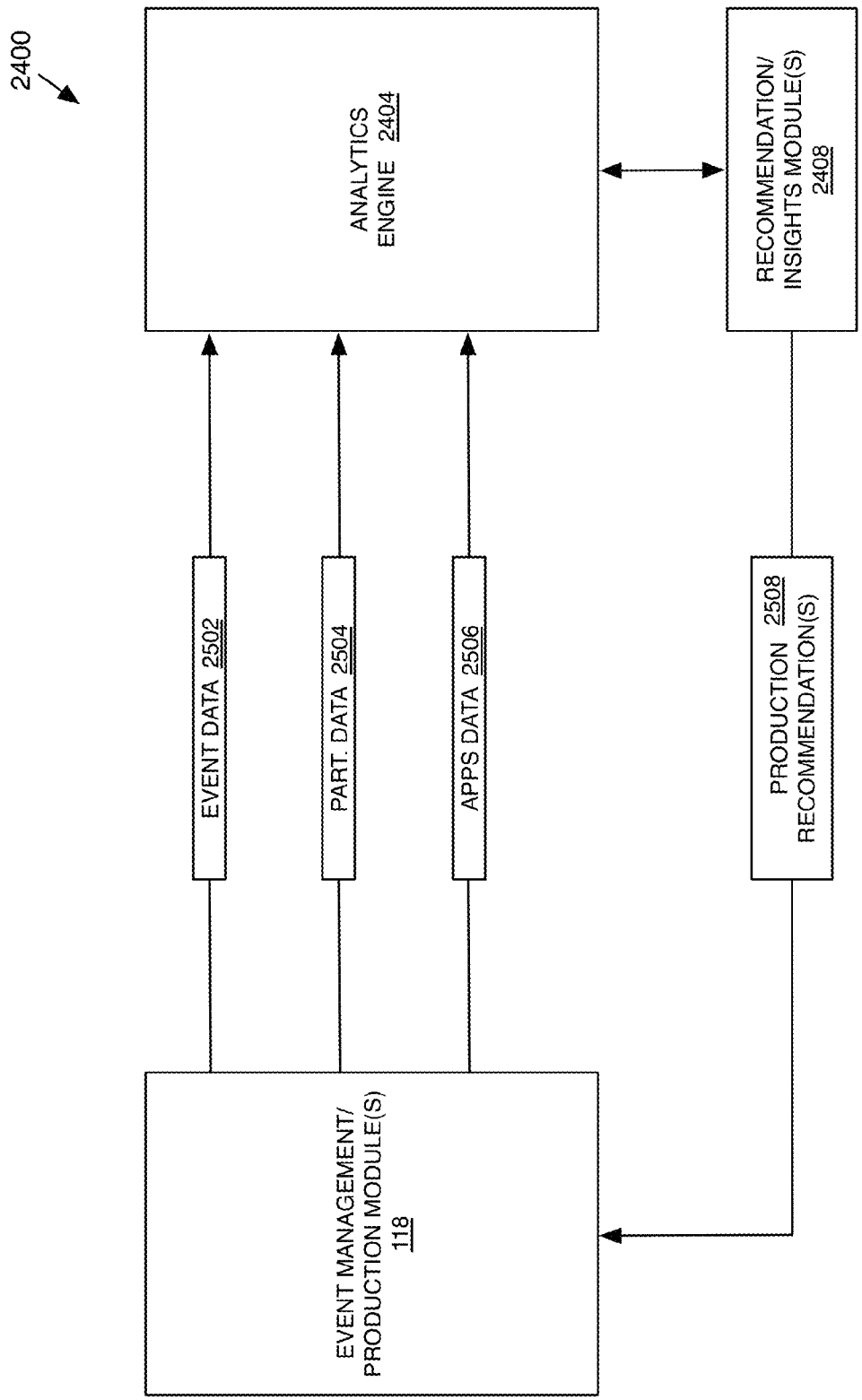
FIG. 25 is a combined block/flow diagram illustrating architecture, operation, and/or functionality of the analytics engine of FIG. 24.
Figure 29:
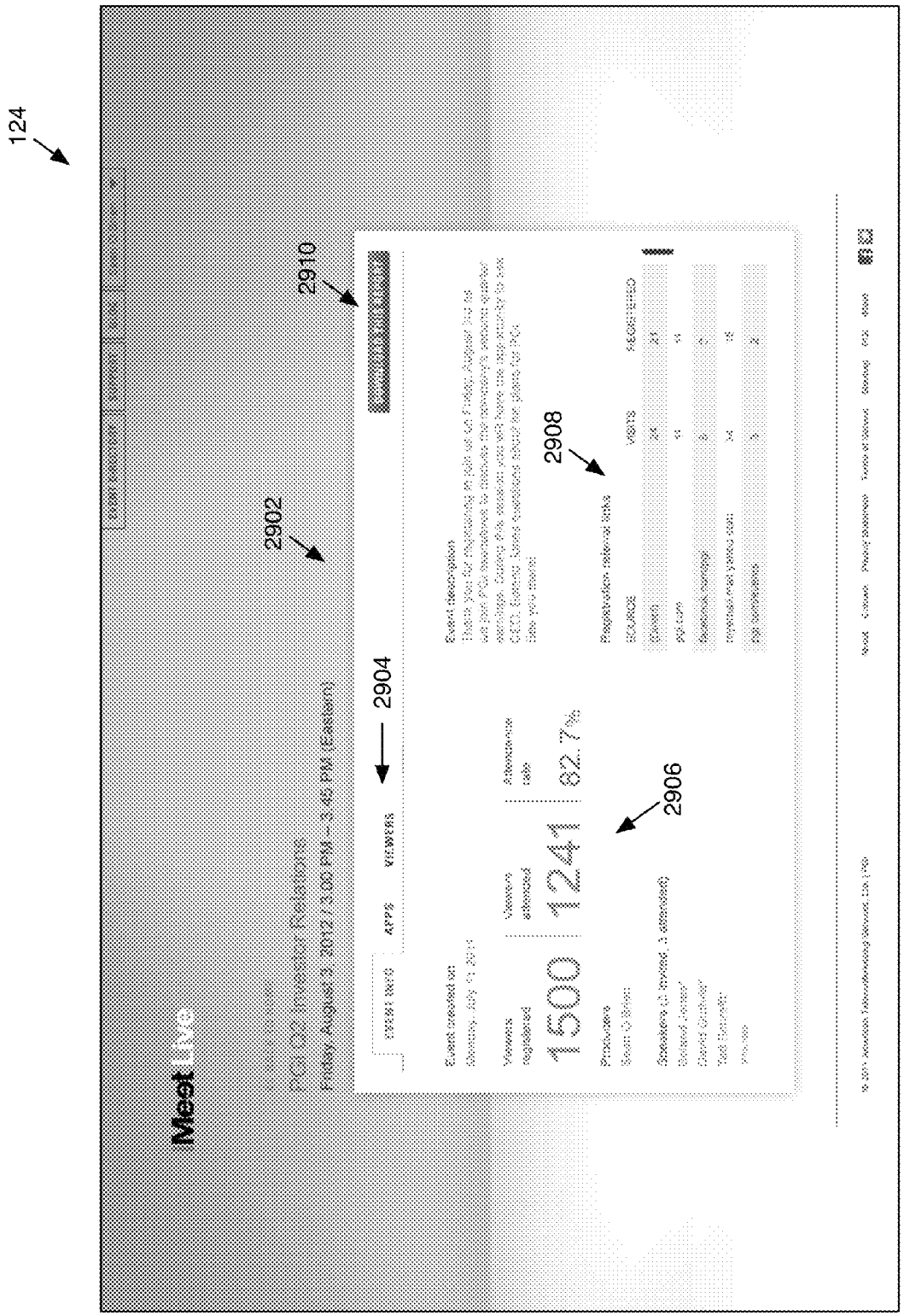
FIG. 29 illustrates a screen shot of an embodiment of a user interface for viewing event analytics.

FIGS. 29-36 illustrate screen shots of an exemplary user interface for viewing analytics related to an online event 111. In an embodiment, the exemplary user interface comprises the event production user interface 124. FIG. 29 shows a window 2902 comprising a tabbed navigation component 2904 for viewing event data 2502, participant data 2504, and applications data 2506 (FIG. 25). As illustrated in FIG. 29, the event data 2502 may include data 2906 related to, for example, a number of registered viewers, a number of viewers attended, an attendance rate, the name of the event producer 106, and the invited/attended speakers. Window 2902 may further identify registration referral links (reference numeral 2908) according to a source, number of visits, and number registered. A complete analytics report for an online event 111 may be downloaded via button 2910.

Figure 30:
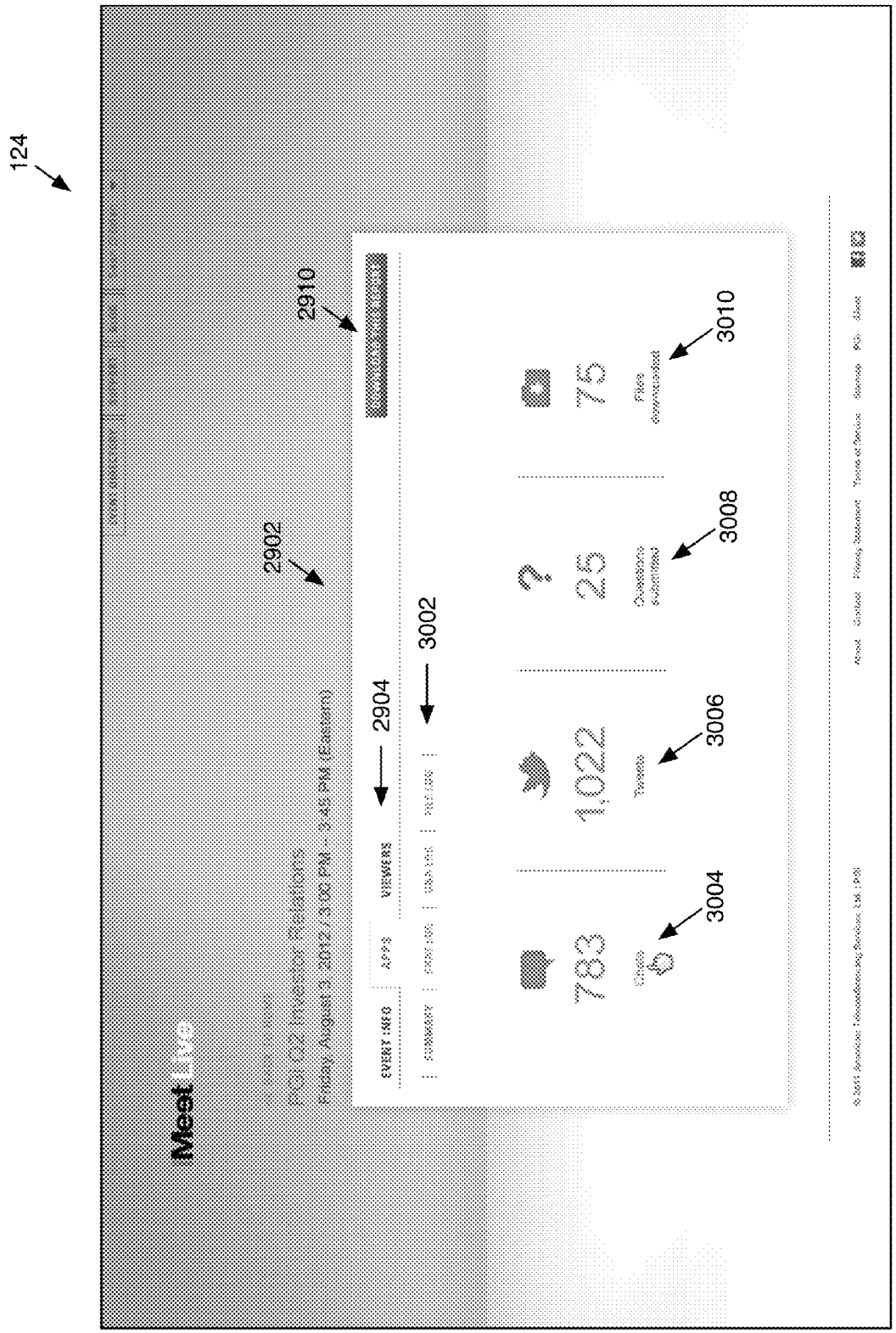
FIG. 30 illustrates a screen shot of an embodiment of a user interface for viewing analytics related to applications used during an online event.

FIG. 30 displays exemplary applications data 2506, which may include a summary of usage of one or more applications, including, for example, a chats application 3004, a social networking application 3006, a Q&A application 3008, and a file sharing application 3010. The applications data 2506 may be organized in a tabbed menu 3002.

Figure 31:
FIG. 31 illustrates a screen shot of an embodiment of a user interface for viewing analytics related to a chat application used during an online event.

FIG. 31 illustrates a "chat log" summary comprising a list 3102 of the chat messages transmitted during the online event 111, the sender, timestamps, and whether the messages were deleted.

Figure 32:
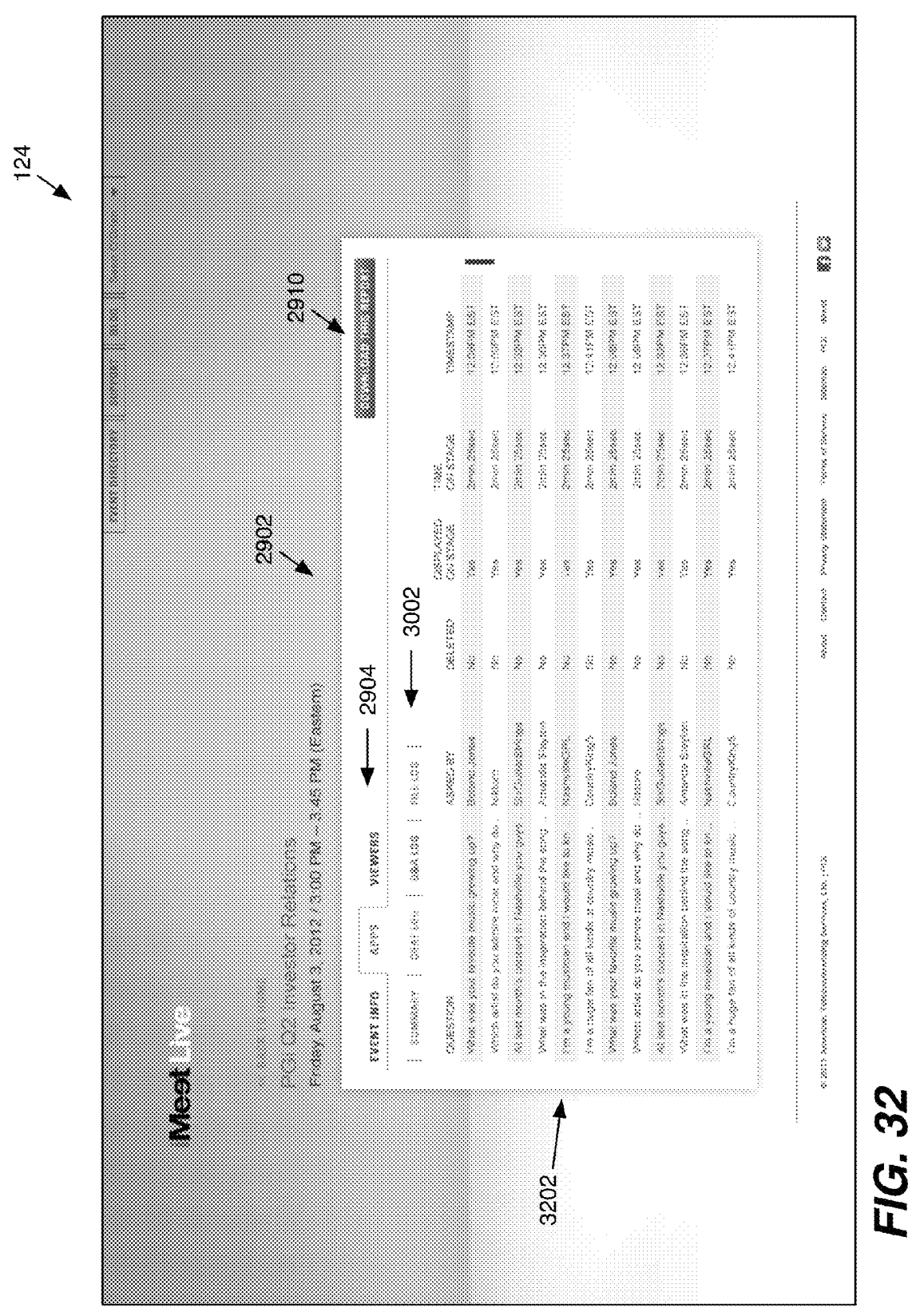

FIG. 32 illustrates a Q&A log comprising a list 3202 of the questions asked, by whom, whether the question was deleted, the amount of time the question was presented, and a timestamp.

Figure 33:
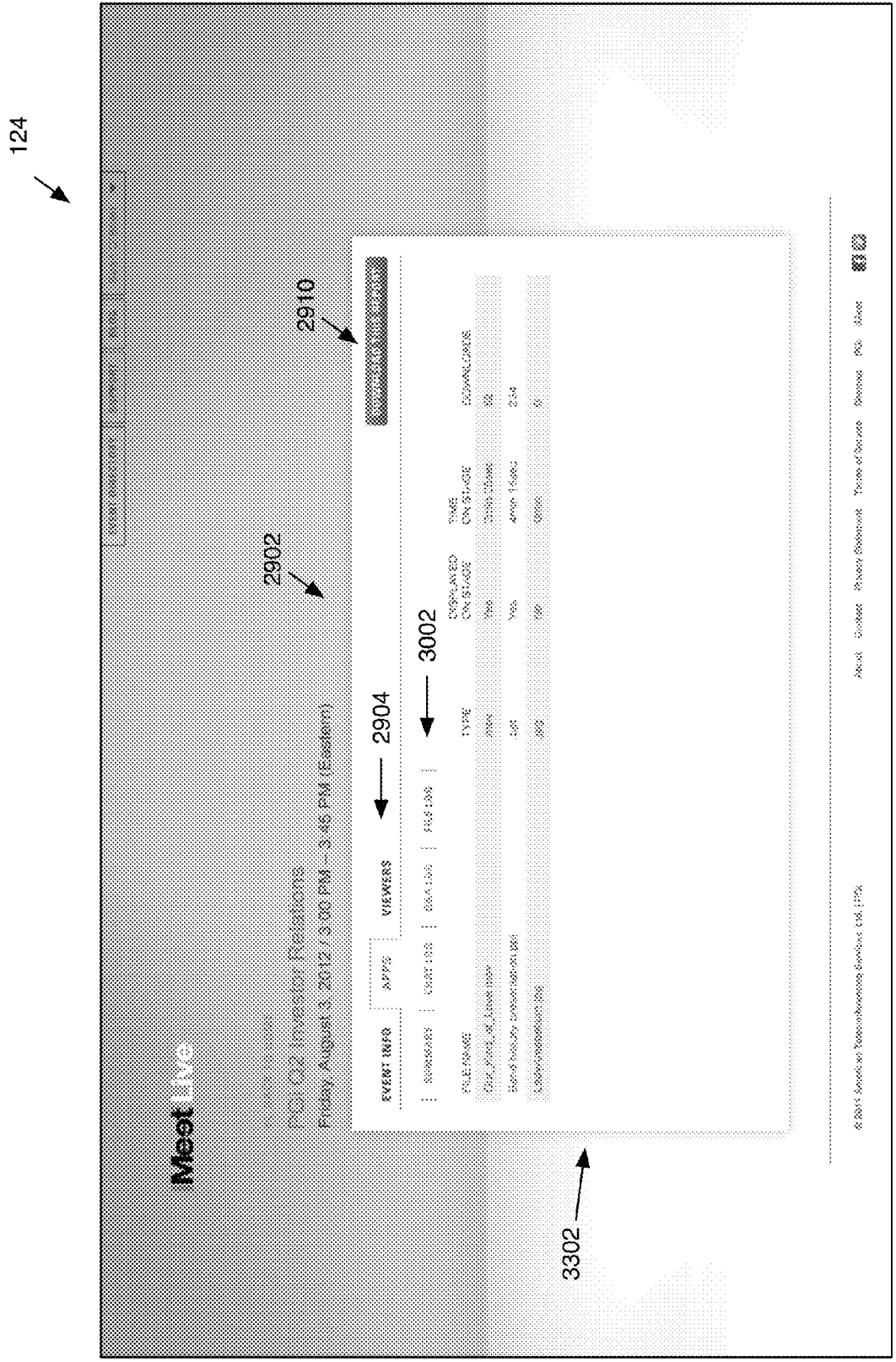
FIG. 33 illustrates a screen shot of an embodiment of a user interface for viewing analytics related to files presented during an online event.

FIG. 33 illustrates a "file log" summary comprising a list 3302 of the files presented according to file name, file type, whether the file was displayed, the amount of time displayed, and a number of times the file was downloaded by the viewers 110 or speakers 108.

Figure 34:
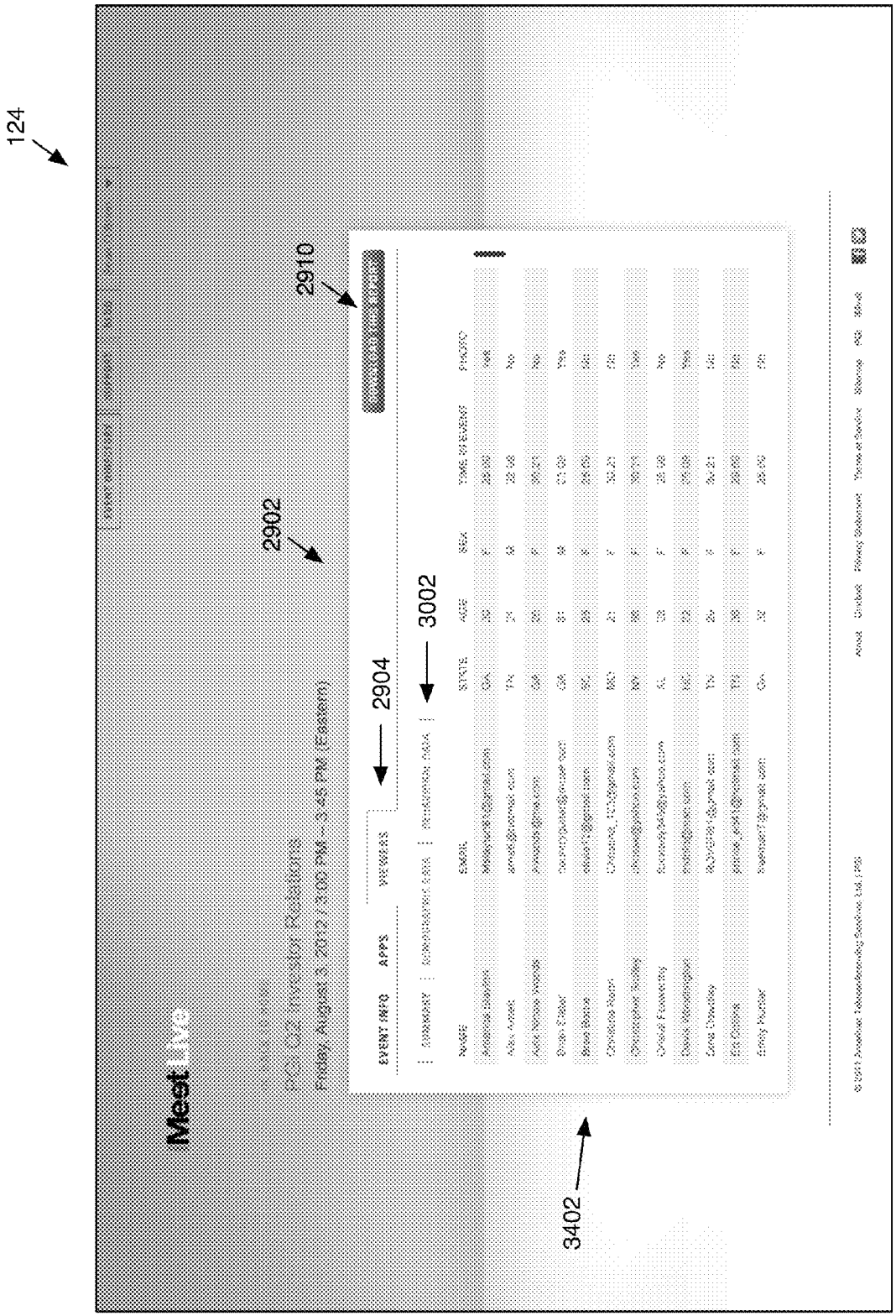
FIG. 34 illustrates a screen shot of an embodiment of a user interface for viewing viewer analytics.
Figure 35:
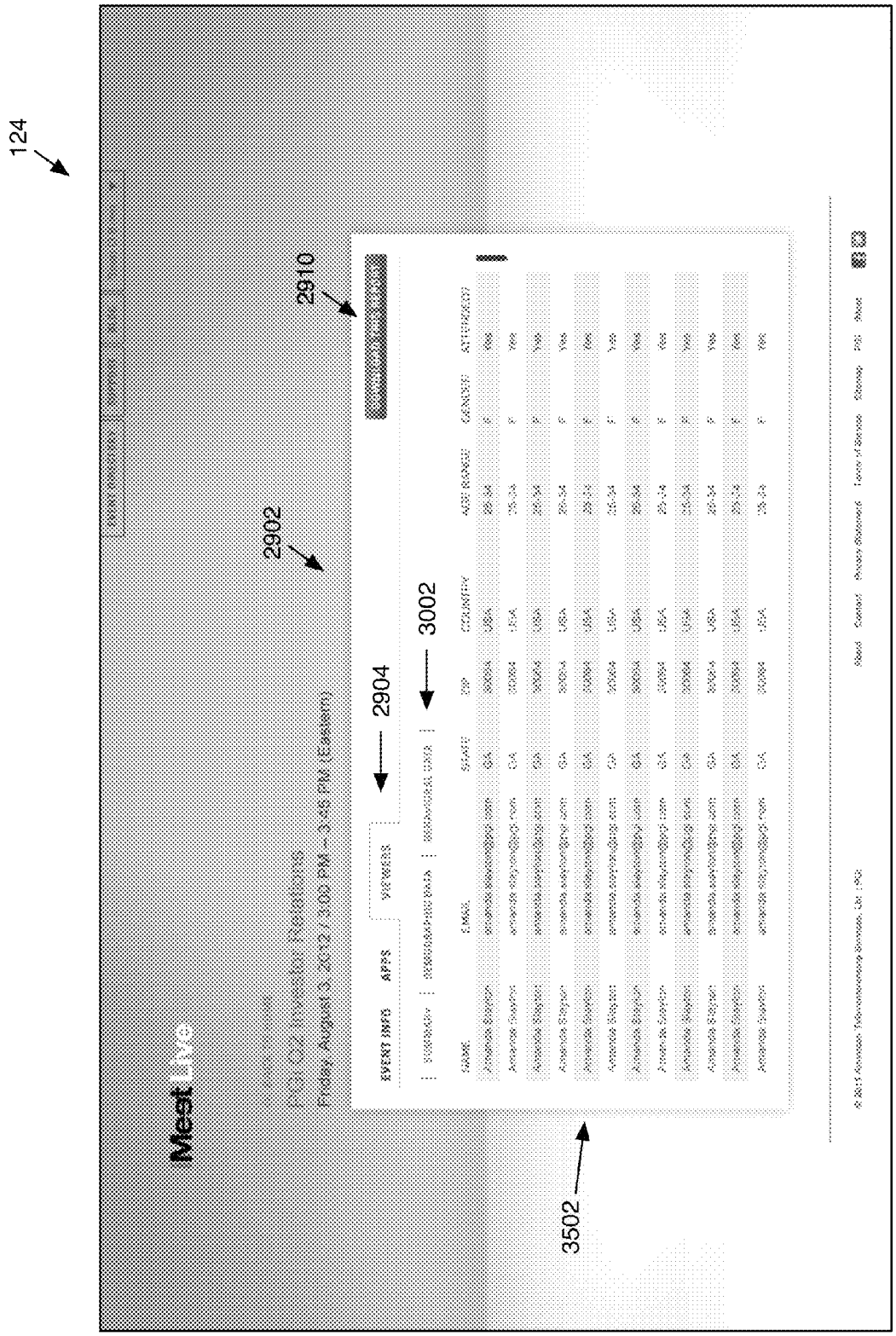
FIG. 35 illustrates a screen shot of an embodiment of a user interface for viewing viewer demographic data from an online event.
Figure 36:
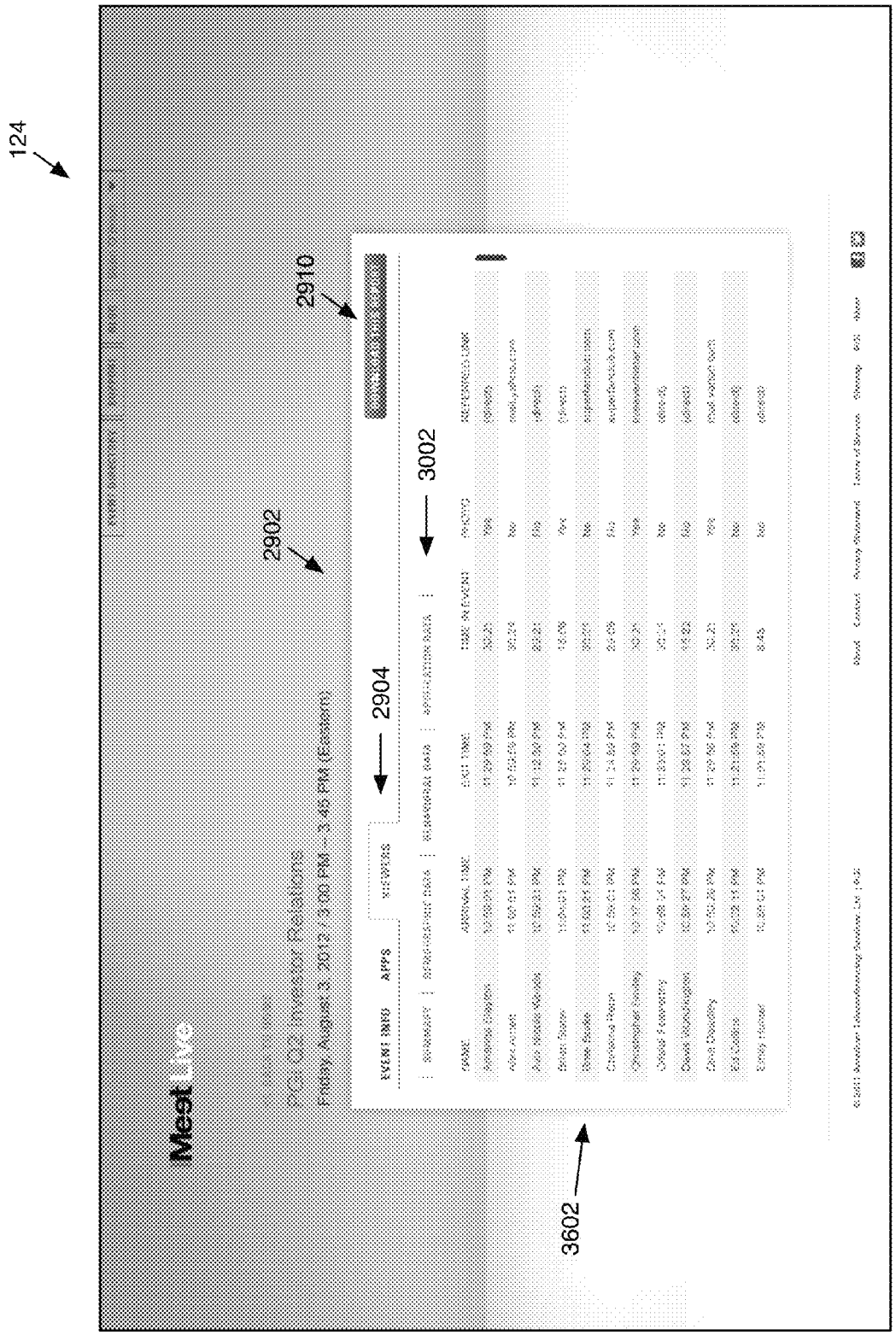
FIG. 36 illustrates a screen shot of an embodiment of a user interface for viewing viewer behavioral data from an online event.

FIGS. 34-36 illustrate an exemplary embodiment of participants data 2504. FIG. 24 illustrates a viewer summary comprising a list 3402 of the viewers 110 who attended the online event 111 with additional information, such as, name, email address, state, age, sex, amount of time in the online event 111, and whether the viewer 111 include a photo in their interactive participant object 1104 (FIG. 11). include a summary of usage of one or more applications, including, for example, a chats application 3004, a social networking application 3006, a Q&A application 3008, and a file sharing application 3010. The applications data 2506 may be organized in a tabbed menu 3002. FIG. 35 displays a list 3502 of the viewers 110 with additional demographic information, such as, zip code, country, age range, gender, etc. FIG. 36 displays a list 3602 of the viewers 110 with behavioral data, such as, an arrival time, an exit time, duration of time in the online event 111, and a referred link.

Figure 37:
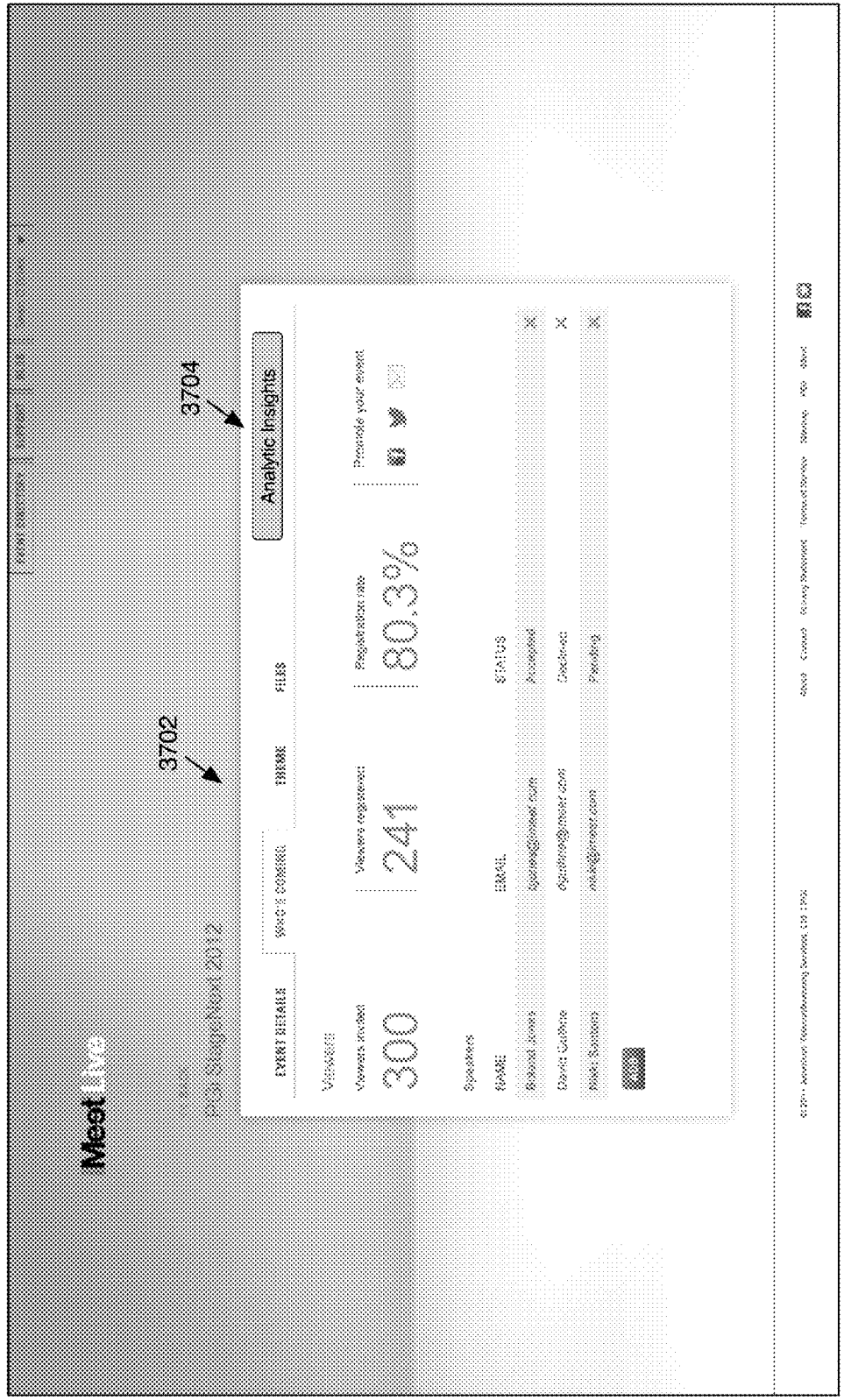
FIG. 37 illustrates a screen shot of an embodiment of a user interface for viewing and speaker registration data.
Figure 38:
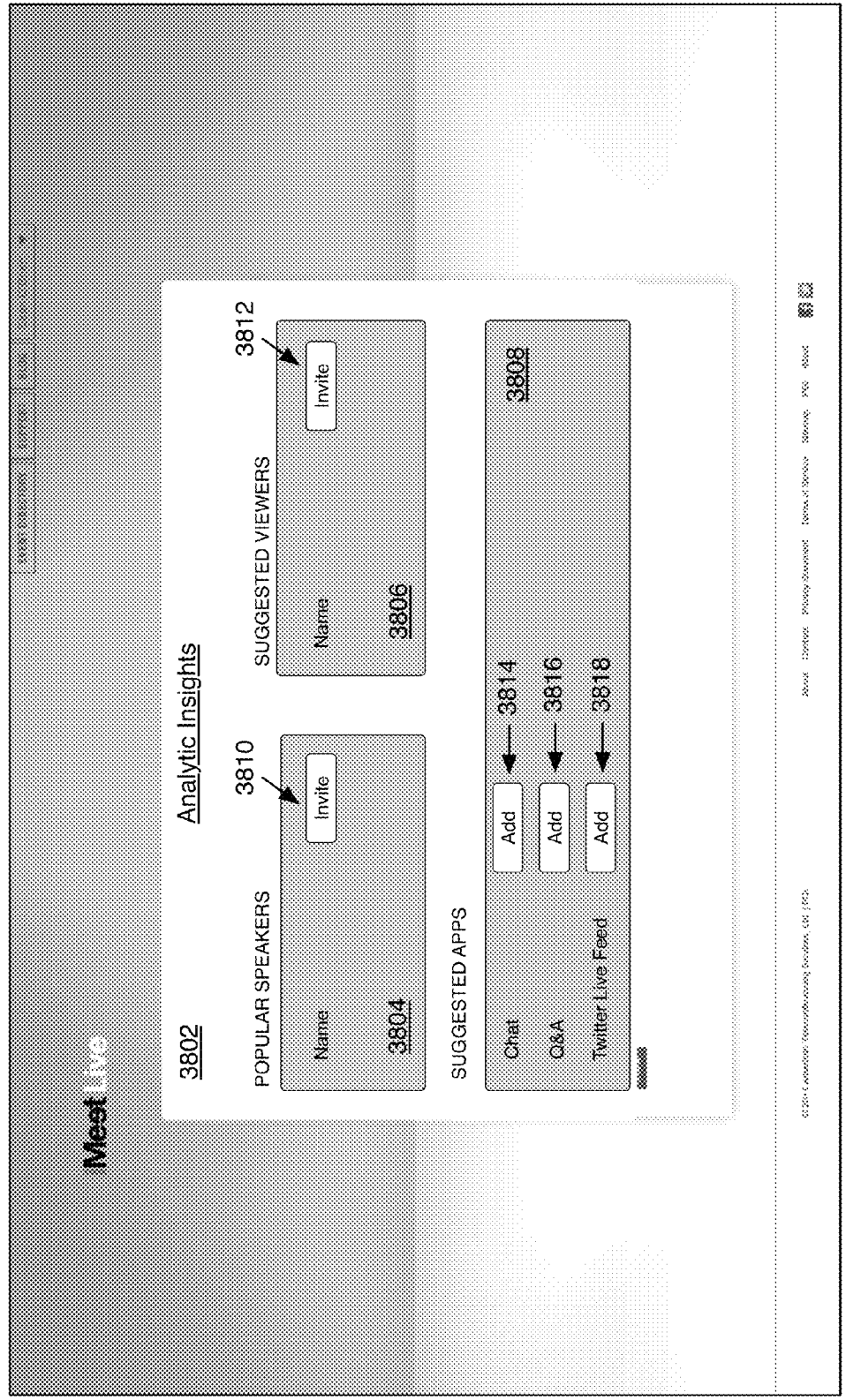
FIG. 38 illustrates a screen shot of an embodiment of an analytics insights user interface.

FIGS. 37 & 38 illustrate embodiments of a user interface for receiving the production recommendations 2508. FIG. 37 illustrates a window 3702 for configuring the online event 111. The window 3702 may include an analytics insights button 3704, which launches a window 3802 (FIG. 38) for viewing and/or selecting the production recommendations 2508. The window 3802 may comprise a portion 3804 for displaying popular speakers and a portion 3806 for displaying suggested viewers 110 for the online event 111. Suggested speakers and viewers may be invited via the invite buttons 3810 and 3812, respectively. The window 3802 may further comprise a portion 3808 for suggesting one or more applications to be used during the online event 111. The applications may be added to the scheduled online event 111 via corresponding add buttons 3814, 3816, and 3818.

Figure 40:
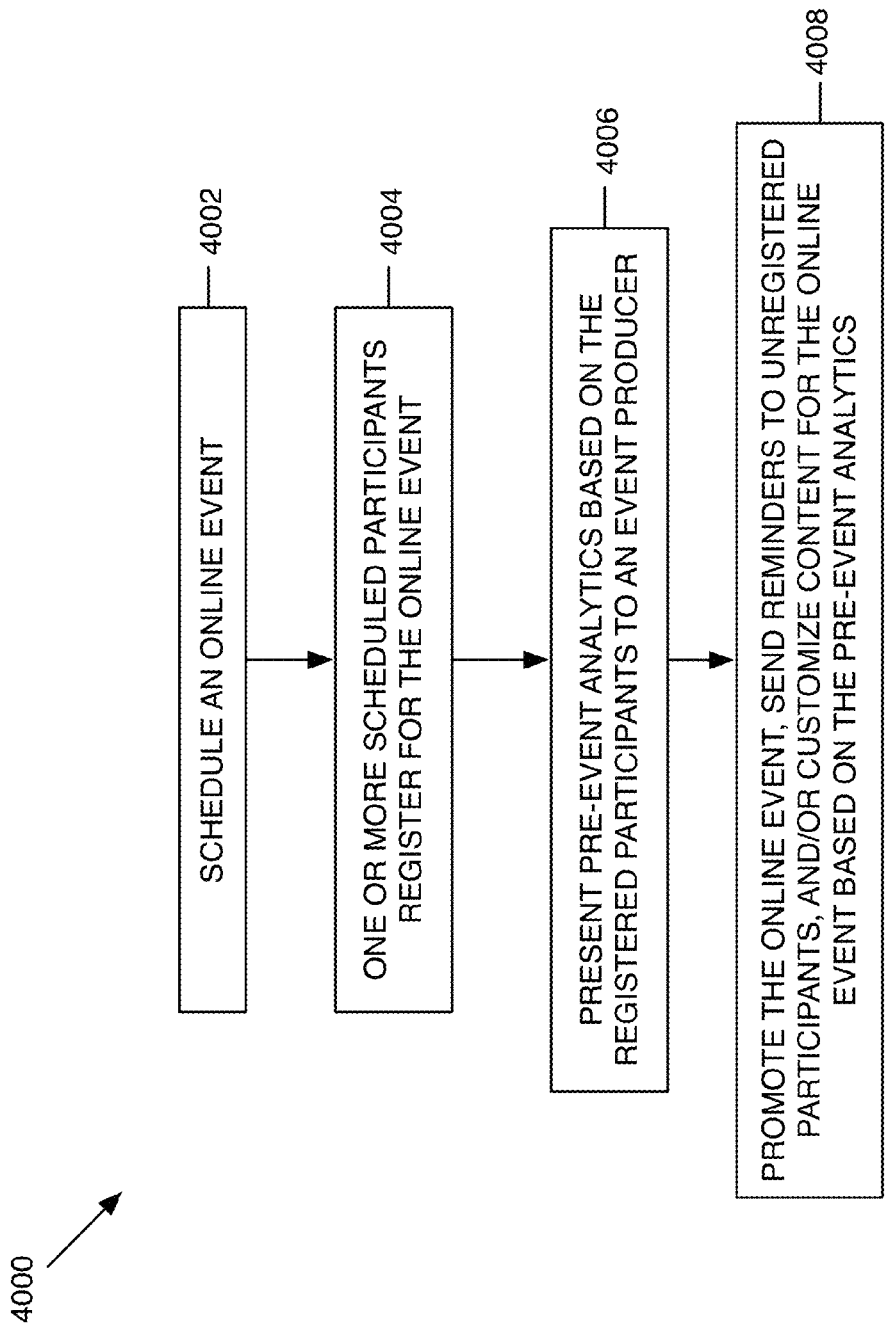
FIG. 40 is a flowchart illustrating an embodiment of a method for providing pre-event analytics before the online event.

As mentioned above, the event analytics system 2402 may provide pre-event analytics or insights to the event producer before the online event 111. FIG. 40 illustrates an embodiment of a method 4000 for providing pre-event analytics. At block 4002, the online event 111 may be scheduled. At block 4004, one or more of the scheduled participants may register for the online event 111. Prior to the online event 111, the event producer may access the event analytics system 2402 via, for example, the event configuration user interface 2602 and/or the event production user interface 120. At block 4006, the event analytics system 2402 may present various types of pre-event analytics to the event producer. At block 4008, the event producer may view the pre-event analytics or insights and take certain recommended actions.

Figure 39:
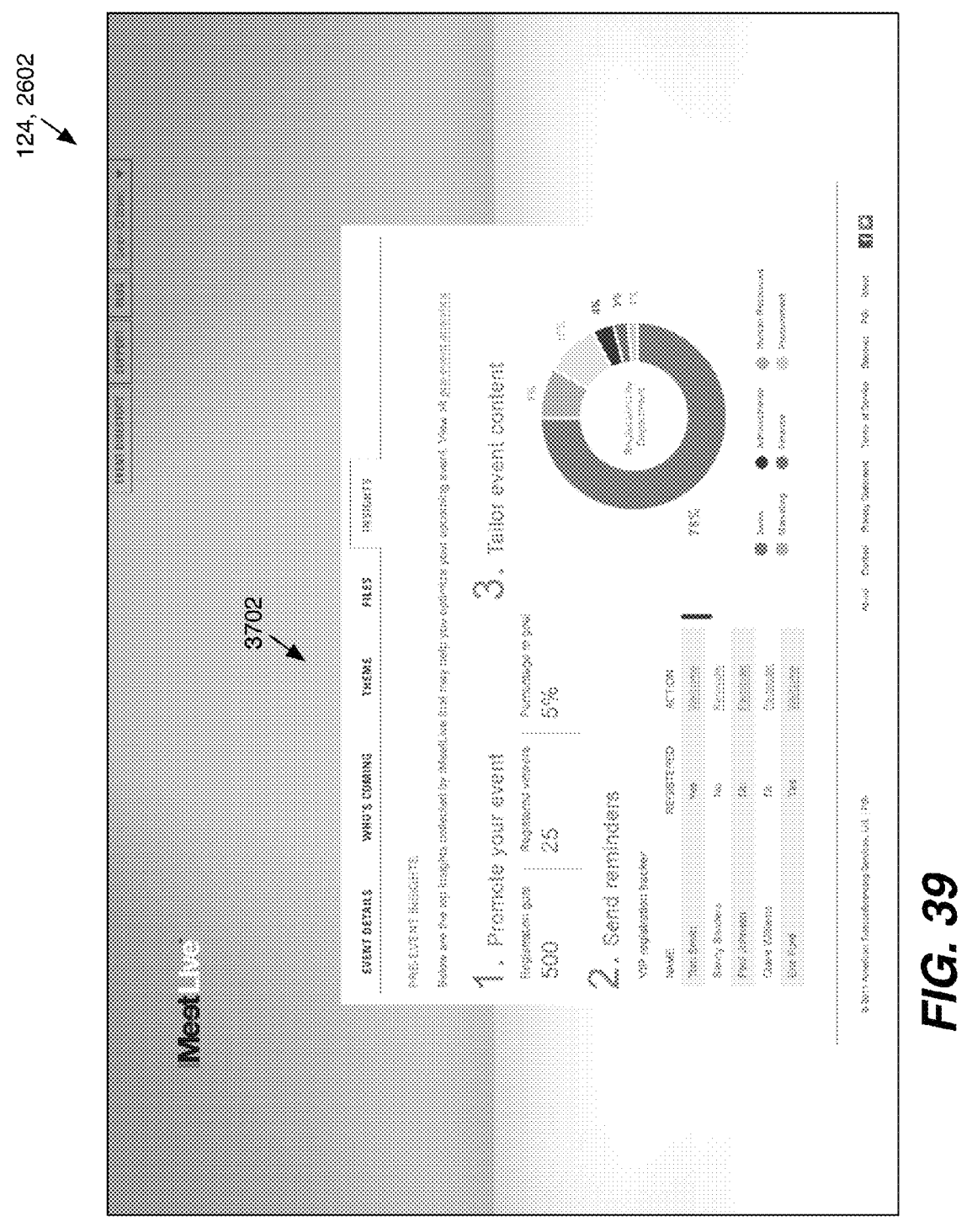

FIG. 39 illustrates an embodiment of the event configuration user interface 2602 for displaying various types of pre-event analytics or insights that may assist the event producer in optimizing or improving the upcoming online event 111. The event configuration user interface 2602 may display, for example, how many viewers have registered versus a pre-defined goal of how many the event producer was hoping to register. If the goal has not been achieved, the event configuration user interface 2602 may recommend actions and provide controls or a menu for further promoting the online event 111. The event configuration user interface 2602 may also identify which referral links are driving the most viewers to register for the event. Additional insights may include demographic trends based on information provided by viewers during registration. For example, the system may determine that a large percentage of viewers are sales or marketing professionals and provide recommendations for customizing the content to be displayed during the online event 111. The event configuration user interface 2602 may identify whether certain VIP participants have registered for the online event 111 and enable the event producer to send reminders to those that have not yet registered.

It should be appreciated that one or more of the process or method descriptions associated with the flow charts or block diagrams above may represent modules, segments, logic or portions of code that include one or more executable instructions for implementing logical functions or steps in the process. It should be further appreciated that the logical functions may be implemented in software, hardware, firmware, or any combination thereof. In certain embodiments, the logical functions may be implemented in software or firmware that is stored in memory or non-volatile memory and that is executed by hardware (e.g., microcontroller) or any other processor(s) or suitable instruction execution system associated with the computer system 100. Furthermore, the logical functions may be embodied in any computer readable medium for use by or in connection with an instruction execution system, apparatus, or device, such as a computer-based system, processor-containing system, or other system associated with the computer system 100 that can fetch the instructions from the instruction execution system, apparatus, or device and execute the instructions.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method for producing an online event, the method comprising:
    a conferencing system establishing an audio conference between one or more speakers and a plurality of listen-only viewers accessing the conferencing system via a communication network;
    the conferencing system presenting an event production user interface to an event producer, the event production user interface configured to enable the event producer to selectively control a viewer user interface presented to the listen-only viewers during the online event;
    obtaining analytics data associated with the online event; and
    during the online event, providing a production recommendation to the event producer in the event production user interface based on the analytics data.

2. The method of claim 1, wherein the obtaining the analytics data associated with the online event comprises monitoring one or more applications provided to the listen-only viewers in the viewer user interface.

3. The method of claim 1, wherein the obtaining the analytics data associated with the online event comprises tracking viewer or speaker activities.

4. The method of claim 1, wherein the analytics data comprises one or more of viewer registration data, viewer demographic data, and viewer behavioral data.

5. The method of claim 1, wherein the providing the production recommendation to the event producer further comprises:
    receiving an event production control command initiated via the event production user interface; and
    the conferencing system updating the viewer user interface in response to the event production control command.

6. The method of claim 5, wherein the event production control command comprises one or more of a selection of media to present in the viewer user interface during the online event, a chat moderator command for controlling a group chat presented in the viewer user interface, a selection of an active speaker from a plurality of speakers, and a selection of a question submitted by one of the listen-only viewers for presentation to a speaker user interface and the viewer user interface.

7. The method of claim 1, wherein the analytics data comprises one or more of a number of registered viewers, a number of viewers attending the online event, an attendance rate, and registration referral link information.

8. The method of claim 1, wherein the viewer user interface visually identifies one or more of the participant speakers with a unique participant object identifying the corresponding speaker.

9. The method of claim 8, wherein the unique participant objects comprise an interactive object having at least two display portions for selectively displaying information associated with the corresponding participant.

10. The method of claim 9, wherein the at least two display portions comprise one or more of default identification information, a business card component, an image, and a social networking channel associated with the corresponding participant.

11. The method of claim 1, wherein the event production user interface comprises a media selection component for enabling the event producer to specify media to be presented to the listen-only viewers in the viewer user interface during the online event.

12. The method of claim 1, wherein the event production user interface comprises a chat moderator component for enabling the event producer to view and manage chat messages received from the listen-only viewers via the viewer user interface.

13. The method of claim 1, wherein the viewer user interface comprises a question submission component for enabling the listen-only viewers to submit a question, the event production user interface comprises a question queue for displaying submitted questions, and wherein the question queue is configured to enable the event producer to select one of the submitted questions to be presented in the viewer user interface.

14. The method of claim 1, further comprising:
    storing the analytics data for the online event in a database; and
    providing access to the analytics data after the online event.

15. The method of claim 14, wherein the analytics data is used to configure a future online event.

16. The method of claim 14, wherein the providing access to the analytics data after the online event comprises downloading a report via the event production user interface.

17. The computer system of claim 1, further comprising:
    an analytics database for storing the analytics data for the online event; and
    an event configuration interface for accessing the analytics database to configure a future online event.

18. A computer program embodied in a non-transitory computer readable medium and executable by a processor for producing an online event, the computer program comprising logic configured to:
    establish an audio conference between one or more speakers and a plurality of listen-only viewers accessing the conferencing system via a communication network;
    present an event production user interface to an event producer, the event production user interface configured to enable the event producer to selectively control a viewer user interface presented to the listen-only viewers during the online event;
    obtain analytics data associated with the online event; and during the online event, provide a production recommendation to the event producer in the event production user interface based on the analytics data.

19. The computer program of claim 18, wherein the logic configured to obtain the analytics data associated with the online event comprises logic configured to monitor one or more applications provided to the listen-only viewers in the viewer user interface.

20. The computer program of claim 18, wherein the logic configured to obtain the analytics data associated with the online event comprises logic configured to track viewer or speaker activities.

21. The computer program of claim 18, wherein the analytics data comprises one or more of viewer registration data, viewer demographic data, and viewer behavioral data.

22. The computer program of claim 18, wherein the logic configured to provide the production recommendation to the event producer further comprises logic configured to:
   receive an event production control command initiated via the event production user interface; and
   update the viewer user interface in response to the event production control command.

23. The computer program of claim 22, wherein the event production control command comprises one or more of a selection of media to present in the viewer user interface during the online event, a chat moderator command for controlling a group chat presented in the viewer user interface, a selection of an active speaker from a plurality of speakers, and a selection of a question submitted by one of the listen-only viewers for presentation to a speaker user interface and the viewer user interface.

24. The computer program of claim 18, wherein the analytics data comprises one or more of a number of registered viewers, a number of viewers attending the online event, an attendance rate, and registration referral link information.

25. The computer program of claim 18, wherein the viewer user interface visually identifies one or more of the participant speakers with a unique participant object identifying the corresponding speaker.

26. The computer program of claim 25, wherein the unique participant objects comprise an interactive object having at least two display portions for selectively displaying information associated with the corresponding participant.

27. The computer program of claim 26, wherein the at least two display portions comprise one or more of default identification information, a business card component, an image, and a social networking channel associated with the corresponding participant.

28. The computer program of claim 18, wherein the event production user interface comprises a media selection component for enabling the event producer to specify media to be presented to the listen-only viewers in the viewer user interface during the online event.

29. The computer program of claim 18, wherein the event production user interface comprises a chat moderator component for enabling the event producer to view and manage chat messages received from the listen-only viewers via the viewer user interface.

30. The computer program of claim 18, wherein the viewer user interface comprises a question submission component for enabling the listen-only viewers to submit a question, the event production user interface comprises a question queue for displaying submitted questions, and wherein the question queue is configured to enable the event producer to select one of the submitted questions to be presented in the viewer user interface.

31. The computer program of claim 18, further comprising logic configured to:
   store the analytics data for the online event in a database; and
   provide access to the analytics data after the online event.

32. The computer program of claim 31, wherein the analytics data is used to configure a future online event.

33. The computer program of claim 31, wherein the logic configured to provide access to the analytics data after the online event comprises logic configured to download a report via the event production user interface.

34. A computer system comprising:
   a conferencing system for establishing an audio conference between a plurality of listen-only viewers, an event producer, and one or more speakers, each operating a corresponding computing device connected via a communication network;
   an event management/production system in communication with the conferencing system, the event management/production system comprising logic executed by a processor and configured to present an event production user interface to the event producer, the event production user interface configured to enable the event producer to selectively control a viewer user interface presented to the listen-only viewers during the online event; and
   an analytics engine comprising logic executed by the processor and configured to receive analytics data associated with the online event and, during the online event, provide a production recommendation to the event producer in the event production user interface based on the analytics data.

35. The computer system of claim 34, wherein the analytics engine is further configured to monitor one or more applications provided to the listen-only viewers in the viewer user interface.

36. The computer system of claim 34, wherein the analytics engine is further configured to receive viewer or speaker activities from the event management/production system.

37. The computer system of claim 34, wherein the analytics data comprises one or more of viewer registration data, viewer demographic data, and viewer behavioral data.

38. The computer system of claim 34, wherein the event management/production system is further configured to:
   receive, via the event production user interface, an event production control command associated with the production recommendation; and
   update the viewer user interface in response to the event production control command associated with the production recommendation.

39. The computer system of claim 38, wherein the event production control command comprises one or more of a selection of media to present in the viewer user interface during the online event, a chat moderator command for controlling a group chat presented in the viewer user interface, a selection of an active speaker from a plurality of speakers, and a selection of a question submitted by one of the listen-only viewers for presentation to a speaker user interface and the viewer user interface.

40. The computer system of claim 34, wherein the analytics data comprises one or more of a number of registered viewers, a number of viewers attending the online event, an attendance rate, and registration referral link information.

41. The computer system of claim 34, wherein the viewer user interface visually identifies one or more of the participant speakers with a unique participant object identifying the corresponding speaker.

42. The computer system of claim 41, wherein the unique participant objects comprise an interactive object having at least two display portions for selectively displaying information associated with the corresponding participant.

43. The computer system of claim 42, wherein the at least two display portions comprise one or more of default identification information, a business card component, an image, and a social networking channel associated with the corresponding participant.

44. The computer system of claim 34, wherein the event production user interface comprises a media selection component for enabling the event producer to specify media to be presented to the listen-only viewers in the viewer user interface during the online event.

45. The computer system of claim 34, wherein the event production user interface comprises a chat moderator component for enabling the event producer to view and manage chat messages received from the listen-only viewers via the viewer user interface.

46. The computer system of claim 34, wherein the viewer user interface comprises a question submission component for enabling the listen-only viewers to submit a question, the event production user interface comprises a question queue for displaying submitted questions, and wherein the question queue is configured to enable the event producer to select one of the submitted questions to be presented in the viewer user interface.

* * * * *